(12) United States Patent
Sullivan et al.

(10) Patent No.: US 9,901,784 B2
(45) Date of Patent: *Feb. 27, 2018

(54) MULTI-LAYERED GOLF BALLS HAVING FOAM CENTER WITH SELECTIVE WEIGHT DISTRIBUTION

(71) Applicant: Acushnet Company, Fairhaven, MA (US)

(72) Inventors: Michael J. Sullivan, Old Lyme, CT (US); Brian Comeau, Berkley, MA (US); Douglas S. Goguen, New Bedford, MA (US); Shawn Ricci, New Bedford, MA (US); Mark L. Binette, Mattapoisett, MA (US); Michael Michalewich, Norton, MA (US)

(73) Assignee: Acushnet Company

( * ) Notice: Subject to any disclaimer, the term of this patent is extended or adjusted under 35 U.S.C. 154(b) by 10 days.

This patent is subject to a terminal disclaimer.

(21) Appl. No.: 15/010,054

(22) Filed: Jan. 29, 2016

(65) Prior Publication Data

US 2016/0144242 A1     May 26, 2016

Related U.S. Application Data

(63) Continuation of application No. 14/101,431, filed on Dec. 10, 2013, now Pat. No. 9,248,350.

(51) Int. Cl.
*A63B 37/04*     (2006.01)
*A63B 37/12*     (2006.01)
(Continued)

(52) U.S. Cl.
CPC ...... *A63B 37/0076* (2013.01); *A63B 37/0043* (2013.01); *A63B 37/0045* (2013.01);
(Continued)

(58) Field of Classification Search
USPC .................................... 473/351–378
See application file for complete search history.

(56) References Cited

U.S. PATENT DOCUMENTS 4,625,964 A     12/1986 Yamada
4,836,552 A     6/1989 Pucket et al.
(Continued)

FOREIGN PATENT DOCUMENTS

DE     3628077 A1 *  3/1987  ......... A63B 37/0003
EP     0154735        9/1985

*Primary Examiner* — Alvin Hunter
(74) *Attorney, Agent, or Firm* — Daniel W. Sullivan

(57) ABSTRACT

Multi-layered golf balls having a core made of a foamed composition, preferably polyurethane foam, are provided. The ball includes a dual-layered core having a foam inner core (center) and surrounding outer core layer. The outer core layer may be made from a non-foamed thermoset material such as polybutadiene rubber. The ball further includes an inner cover, preferably made from an ionomer composition comprising an O/X-type acid copolymer, wherein O is α-olefin, and X is a $C_3$-$C_8$ α,β-ethylenically unsaturated carboxylic acid. The outer cover may be made from a non-foamed thermoset or thermoplastic material such as polyurethane. Preferably, the specific gravity of the inner cover is greater than the specific gravity of the outer core, which is greater than the specific gravity of the inner core. The finished ball has good distance and low-spin properties.

10 Claims, 3 Drawing Sheets

(51) Int. Cl.
*A63B 37/00* (2006.01)
*A63B 45/00* (2006.01)
*C08K 5/098* (2006.01)

(52) U.S. Cl.
CPC ...... *A63B 37/0047* (2013.01); *A63B 37/0058* (2013.01); *A63B 37/0062* (2013.01); *A63B 37/0064* (2013.01); *A63B 37/0066* (2013.01); *A63B 37/0091* (2013.01); *A63B 37/0092* (2013.01); *A63B 45/00* (2013.01); *C08K 5/098* (2013.01); *A63B 37/0039* (2013.01); *A63B 37/0094* (2013.01)

(56) References Cited

U.S. PATENT DOCUMENTS

| | | | |
|---|---|---|---|
| 4,839,116 | A | 6/1989 | Puckett et al. |
| 5,048,838 | A | 9/1991 | Chikaraishi et al. |
| 5,104,126 | A | 4/1992 | Gentiluomo |
| 5,253,871 | A | 10/1993 | Viollaz |
| 5,439,227 | A | 8/1995 | Egashira et al. |
| 5,482,285 | A | 1/1996 | Yabuki et al. |
| 5,556,098 | A | 9/1996 | Higuchi et al. |
| 5,688,192 | A | 11/1997 | Aoyama |
| 5,688,595 | A | 11/1997 | Yamagishi et al. |
| 5,725,442 | A | 3/1998 | Higuchi et al. |
| 5,823,889 | A | 10/1998 | Aoyama |
| 5,833,553 | A | 11/1998 | Sullivan et al. |
| 6,057,403 | A | 5/2000 | Sullivan et al. |
| 6,120,393 | A | 9/2000 | Sullivan et al. |
| 6,142,887 | A | 11/2000 | Sullivan et al. |
| 6,213,895 | B1 | 4/2001 | Sullivan et al. |
| 6,245,859 | B1 | 6/2001 | Sullivan et al. |
| 6,386,992 | B1 * | 5/2002 | Harris ............... A63B 37/0003 473/356 |
| 6,390,935 | B1 | 5/2002 | Sugimoto |
| 6,431,999 | B1 | 8/2002 | Nesbitt |
| 6,494,795 | B2 | 12/2002 | Sullivan |
| 6,520,872 | B2 | 2/2003 | Endo et al. |
| 6,595,874 | B2 | 7/2003 | Sullivan et al. |
| 6,634,962 | B2 | 10/2003 | Sullivan |
| 6,688,991 | B2 | 2/2004 | Sullivan et al. |
| 6,692,380 | B2 | 2/2004 | Sullivan et al. |
| 6,743,123 | B2 | 6/2004 | Sullivan |
| 6,756,436 | B2 | 6/2004 | Rajagopalan et al. |
| 6,767,294 | B2 * | 7/2004 | Nesbitt ............... A63B 37/0003 473/351 |
| 6,773,364 | B2 | 8/2004 | Sullivan et al. |
| 6,852,042 | B2 | 2/2005 | Sullivan et al. |
| 6,929,567 | B2 | 8/2005 | Sullivan et al. |
| 6,939,249 | B2 | 9/2005 | Sullivan |
| 6,988,962 | B2 * | 1/2006 | Sullivan ............. A63B 37/0003 473/376 |
| 6,995,191 | B2 | 2/2006 | Sullivan et al. |
| 7,022,034 | B2 | 4/2006 | Sullivan et al. |
| 7,147,578 | B2 | 12/2006 | Nesbitt et al. |
| 7,160,208 | B2 | 1/2007 | Watanabe |
| 7,255,656 | B2 | 8/2007 | Sullivan et al. |
| 7,371,192 | B2 | 5/2008 | Sullivan et al. |
| 7,452,291 | B2 * | 11/2008 | Sullivan ............. A63B 37/0003 473/377 |
| 7,708,654 | B2 * | 5/2010 | Sullivan ............. A63B 37/0003 473/373 |
| 7,785,216 | B2 | 8/2010 | Hebert et al. |
| 7,935,004 | B2 | 5/2011 | Dalton et al. |
| 8,272,971 | B2 | 9/2012 | Tutmark |
| 8,715,110 | B2 * | 5/2014 | Sullivan ............. A63B 37/0003 473/373 |
| 8,998,750 | B2 * | 4/2015 | Sullivan ............. A63B 37/0058 473/376 |
| 9,005,053 | B2 * | 4/2015 | Sullivan ............. A63B 37/0058 473/376 |
| 9,050,501 | B2 * | 6/2015 | Sullivan ............. A63B 37/0032 |
| 9,126,083 | B2 * | 9/2015 | Sullivan ............. A63B 37/0051 |
| 9,248,350 | B2 * | 2/2016 | Sullivan ............. A63B 37/0064 |

* cited by examiner

MULTI-LAYERED GOLF BALLS HAVING FOAM CENTER WITH SELECTIVE WEIGHT DISTRIBUTION

CROSS-REFERENCE TO RELATED APPLICATIONS

This application is a continuation of co-assigned, co-pending U.S. patent application Ser. No. 14/101,431 having a filing date of Dec. 10, 2013, now allowed, the entire contents of which are hereby incorporated by reference.

BACKGROUND OF THE INVENTION

Field of the Invention

The present invention relates generally to multi-layered golf balls having a core made of a foamed composition. Particularly, the ball includes a dual-layered core having a foam inner core (center) and surrounding outer core layer, preferably made from a thermoset rubber. The ball further includes an inner cover, preferably made from a thermoplastic ionomer composition; and an outer polyurethane cover. The core and inner cover layers have selective weight distribution such that the layers have different densities. The finished ball has good distance and low-spin properties.

Brief Review of the Related Art

Both professional and amateur golfer use multi-piece, solid golf balls today. Basically, a two-piece solid golf ball includes a solid inner core protected by an outer cover. The inner core is made of a natural or synthetic rubber such as polybutadiene, styrene butadiene, or polyisoprene. The cover surrounds the inner core and may be made of a variety of materials including ethylene acid copolymer ionomers, polyamides, polyesters, polyurethanes, and polyureas.

In recent years, three-piece, four-piece, and even five-piece balls have become more popular. New manufacturing technologies, lower material costs, and desirable ball playing performance properties have contributed to these multi-piece balls becoming more popular. Many golf balls used today have multi-layered cores comprising an inner core and at least one surrounding outer core layer. For example, the inner core may be made of a relatively soft and resilient material, while the outer core may be made of a harder and more rigid material. The "dual-core" sub-assembly is encapsulated by a cover of at least one layer to provide a final ball assembly. Different materials can be used to manufacture the core and cover and impart desirable properties to the final ball.

The core sub-assembly located inside of the golf ball acts as an engine or spring for the ball. Thus, the composition and construction of the core is a key factor in determining the resiliency and rebounding performance of the ball. In general, the rebounding performance of the ball is determined by calculating its initial velocity after being struck by the face of the golf club and its outgoing velocity after making impact with a hard surface. More particularly, the "Coefficient of Restitution" or "COR" of a golf ball refers to the ratio of a ball's rebound velocity to its initial incoming velocity when the ball is fired out of an air cannon into a rigid vertical plate. The COR for a golf ball is written as a decimal value between zero and one. A golf ball may have different COR values at different initial velocities. The United States Golf Association (USGA) sets limits on the initial velocity of the ball so one objective of golf ball manufacturers is to maximize COR under such conditions. Balls with a higher rebound velocity have a higher COR value. Such golf balls rebound faster, retain more total energy when struck with a club, and have longer flight distance as opposed to balls with low COR values. These properties are particularly important for long distance shots. For example, balls having high resiliency and COR values tend to travel a far distance when struck by a driver club from a tee.

The durability, spin rate, and feel of the ball also are important properties. In general, the durability of the ball refers to the impact-resistance of the ball. Balls having low durability appear worn and damaged even when such balls are used only for brief time periods. In some instances, the cover may be cracked or torn. The spin rate refers to the ball's rate of rotation after it is hit by a club. Balls having a relatively high spin rate are advantageous for short distance shots made with irons and wedges. Professional and highly skilled amateur golfers can place a back spin more easily on such balls. This helps a player better control the ball and improves shot accuracy and placement. By placing the right amount of spin on the ball, the player can get the ball to stop precisely on the green or place a fade on the ball during approach shots. On the other hand, recreational players who cannot intentionally control the spin of the ball when hitting it with a club are less likely to use high spin balls. For such players, the ball can spin sideways more easily and drift far-off the course, especially if it is hooked or sliced. Meanwhile, the "feel" of the ball generally refers to the sensation that a player experiences when striking the ball with the club and it is a difficult property to quantify. Most players prefer balls having a soft feel, because the player experience a more natural and comfortable sensation when their club face makes contact with these balls. Balls having a softer feel are particularly desirable when making short shots around the green, because the player senses more and can place a better touch on such balls. The feel of the ball primarily depends upon the hardness and compression of the ball.

Manufacturers of golf balls are constantly looking to different materials and ball constructions for improving the playing performance and other properties of the ball. For example, golf ball manufacturers have looked at ball constructions, wherein the density or specific gravity among the multiple layers of the golf ball is adjusted to control its spin rate. The total weight of a golf ball preferably conforms to weight limits set by the United States Golf Association ("USGA"). Although the total weight of the golf ball is controlled, the distribution of weight within the ball can vary. Redistributing the weight or mass of the golf ball either towards the center of the ball or towards the outer surface of the ball changes its flight and spin properties.

For example, the weight can be shifted towards the center of the ball to increase the spin rate as described in Yamada, U.S. Pat. No. 4,625,964, wherein the golf ball contains a core, an intermediate layer, and a cover, and the core has a specific gravity of at least 1.50 and a diameter of less than 32 mm, the intermediate layer having a lower specific gravity than the core. Chikaraishi et al., U.S. Pat. No. 5,048,838 discloses another three-piece golf ball containing a two-piece solid core and a cover. The dense inner core has a diameter in the range of 15-25 mm with a specific gravity of 1.2 to 4.0 and the outer core layer has a specific gravity of 0.1 to 3.0 less than the specific gravity of the inner core. Gentiluomo, U.S. Pat. No. 5,104,126 discloses a ball with a dense inner core made of steel, lead, brass, zinc, copper, and a filled elastomer, wherein the core has a specific gravity of at least 1.25. The inner core is encapsulated by a lower density syntactic foam composition and this construction is encapsulated by an ionomer cover. Yabuki et al., U.S. Pat.

No. 5,482,285 discloses a three-piece golf ball having an inner core and outer core encapsulated by an ionomer cover. The specific gravity of the outer core is reduced so that it falls within the range of 0.2 to 1.0. The specific gravity of the inner core is adjusted so that the total weight of the inner/outer core falls within a range of 32.0 to 39.0 g. In other instances, the weight can be shifted to the outside portion of the ball and away from the center. For example, Sullivan and Nesbitt, U.S. Pat. No. 6,120,393 discloses golf balls having a low spin rate. The balls comprise a relatively soft, multi-piece core and a hard cover. The inner core is hollow and may be filled with gases, while the outer core layer is made of a soft, resilient material. Sullivan and Nesbitt, U.S. Pat. No. 6,142,887 disclose a golf ball containing a core, a thin spherical layer, and a polymeric outer cover. The thin spherical layer comprises a metal, ceramic, or composite material such a silicon carbide, glass, carbon, boron carbide, and aramid materials.

Golf ball manufacturers also have looked at lighter-weight materials, such as foams, for making the inner core. For example, Puckett and Cadorniga, U.S. Pat. Nos. 4,836,552 and 4,839,116 disclose one-piece, short distance golf balls made of a foam composition comprising a thermoplastic polymer (ethylene acid copolymer ionomer such as Surlyn®) and filler material (microscopic glass bubbles). The density of the composition increases from the center to the surface of the ball. Thus, the ball has relatively dense outer skin and a cellular inner core. According to the '552 and '116 patents, by providing a short distance golf ball, which will play approximately 50% of the distance of a conventional golf ball, the land requirements for a golf course can be reduced 67% to 50%.

Gentiluomo, U.S. Pat. No. 5,104,126 discloses a three-piece golf ball (FIG. 2) containing a high density center (3) made of steel, surrounded by an outer core (4) of low density resilient syntactic foam composition, and encapsulated by an ethylene acid copolymer ionomer (Surlyn®) cover (5). The '126 patent defines the syntactic foam as being a low density composition consisting of granulated cork or hollow spheres of either phenolic, epoxy, ceramic or glass, dispersed within a resilient elastomer.

Aoyama, U.S. Pat. Nos. 5,688,192 and 5,823,889 disclose a golf ball containing a core, wherein the core comprising an inner and outer portion, and a cover made of a material such as balata rubber or ethylene acid copolymer ionomer. The core is made by foaming, injecting a compressible material, gasses, blowing agents, or gas-containing microspheres into polybutadiene or other core material. According to the '889 patent, polyurethane compositions may be used. The compressible material, for example, gas-containing compressible cells may be dispersed in a limited part of the core so that the portion containing the compressible material has a specific gravity of greater than 1.00.

Golf ball manufacturers have considered foam inner cores over the years, but they have experienced drawbacks with using such foam materials. For example, one disadvantage with golf balls having a foam core is the ball tends to have low resiliency. That is, the velocity of the ball tends to be low after being hit by a club and the ball generally travels short distances. It would be desirable to have a foam core with improved resiliency that would allow players to generate higher initial ball speed. With higher ball speeds, players can make longer distance shots. Particularly, it would be desirable to develop multi-layered foam core constructions having the proper weight distribution to provide the ball with good distance properties. The present invention provides new foam cores and balls having improved weigh distribution, resiliency and other advantageous properties, features, and benefits.

SUMMARY OF THE INVENTION

The present invention provides a multi-layered golf ball comprising a core having at least two layers; an inner cover layer; and an outer cover layer. In one version, the ball includes a core assembly comprising: i) an inner core layer (center) comprising a foamed polyurethane composition, wherein the inner core has a diameter in the range of about 0.100 to about 1.100 inches, preferably about 0.200 to about 0.900 inches, and a specific gravity ($SG_{center}$), preferably about 0.30 to about 0.95 g/cc, and a center hardness ($H_{inner\ core\ center}$), and ii) an outer core layer comprising a first non-foamed thermoset or thermoplastic composition, wherein the outer core layer is disposed about the inner core and has a thickness in the range of about 0.100 to about 0.750 inches, preferably about 0.200 to about 0.800 inches, and a specific gravity ($SG_{outer\ core}$), preferably about 0.60 to about 1.20 g/cc and an outer surface hardness ($H_{outer\ surface\ of\ OC}$). The inner cover comprises a first or second non-foamed thermoplastic composition and has a specific gravity ($SG_{inner\ cover}$). The outer cover comprises a second or third non-foamed thermoset or thermoplastic composition.

In one preferred embodiment, the $SG_{inner\ cover}$ is about 1.45 g/cc and the $SG_{inner\ cover}$ is greater than the $SG_{outer\ core}$ and the $SG_{outer\ core}$ is greater than the $SG_{center}$. Meanwhile, the ($H_{inner\ core\ center}$) is preferably in the range of about 10 to about 60 Shore C and the ($H_{outer\ surface\ of\ OC}$) is preferably in the range of about 65 to about 96 Shore C to provide a positive hardness gradient across the core assembly. In another embodiment, the $H_{inner\ core\ center}$ is in the range of about 20 to about 80 Shore A and the $H_{outer\ surface\ of\ OC}$ is in the range of about 25 to about 63 Shore D to provide a positive hardness gradient across the core assembly.

In one version, the inner core comprises a foam polyurethane composition prepared from a mixture comprising polyisocyanate, polyol, and curing agent compounds, and blowing agent. Aromatic and aliphatic polyisocyanates may be used. The foamed polyurethane composition may be prepared by using water as a blowing agent. The water is added to the mixture in a sufficient amount to cause the mixture to foam. Surfactants, catalysts, mineral fillers, and other additives may be included in the mixture.

Thermoset or thermoplastic materials are used to form the outer core layer in the present invention. Preferably, the thermoset and thermoplastic materials are non-foamed. Thus, in one embodiment, the dual-core includes a foam inner core (center) and a surrounding non-foamed thermoset core layer that is preferably made from polybutadiene rubber. In another embodiment, the dual-core includes a foam inner core (center) and a surrounding non-foamed thermoplastic core layer. For example, partially or highly neutralized olefin acid copolymers or non-ionomeric polymers may be used.

The inner cover preferably comprises an ionomer composition comprising an O/X/Y-type copolymer, wherein O is α-olefin, X is a $C_3$-$C_8$ α,β-ethylenically unsaturated carboxylic acid, and Y is an acrylate selected from alkyl acrylates and aryl acrylates, wherein greater than 70% of the acid groups are neutralized with a metal ion. The inner cover layer preferably has a thickness in the range of about 0.250 to about 0.750 inches and specific gravity in the range of about 0.60 to about 2.90 g/cc. The outer cover preferably comprises a non-foamed thermoset or thermoplastic polyurethane composition.

The core layers may have different hardness gradients. For example, each core layer may have a positive, zero, or negative hardness gradient. In a first embodiment, the inner core has a positive hardness gradient; and the outer core layer has a positive hardness gradient. In a second embodiment, the inner core has a positive hardness gradient, and the outer core layer has zero or negative hardness gradient. In yet another version, the inner core has a zero or negative hardness gradient; and the outer core layer has a positive hardness gradient. In another alternative version, both the inner and outer core layers have zero or negative hardness gradients. In one embodiment, the center hardness of the foamed inner core layer ($H_{inner\ core\ center}$) is in the range of about 15 to about 80 Shore A and the outer surface hardness of the foamed inner core layer ($H_{inner\ core\ surface}$) is in the range of about 20 to about 95 Shore A. In another embodiment, the $H_{inner\ core\ center}$ is in the range of about 15 to about 80 Shore A and the H in the inner core surface is range of about 10 to about 75 Shore A. The outer core layer may have a midpoint hardness ($H_{midpoint\ of\ OC}$) and an outer surface hardness ($H_{outer\ surface\ of\ OC}$). In one example, the ($H_{midpoint\ of\ OC}$) is in the range of about 40 to about 87 Shore C and the ($H_{outer\ surface\ of\ OC}$) is in the range of about 72 to about 95 Shore C.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description in connection with the accompanying drawings in which:

DETAILED DESCRIPTION OF THE INVENTION

Golf Ball Constructions

Golf balls having various constructions may be made in accordance with this invention. For example, golf balls having four-piece and five-piece constructions may be made. Representative illustrations of such golf ball constructions are provided and discussed further below. The term, "layer" as used herein means generally any spherical portion of the golf ball. More particularly, in one version, a four-piece golf ball containing a dual-core (inner core [center] and outer core layers); an inner cover layer; and outer cover layer is made. In another version, a five-piece golf ball containing a dual-core; a casing layer; and dual-cover (inner cover and outer cover layers) is made. As used herein, the term, "casing layer" means a layer of the ball disposed between the multi-layered core sub-assembly and multi-layered cover. The casing layer also may be referred to as a mantle or intermediate layer. The diameter and thickness of the different layers along with properties such as hardness and compression may vary depending upon the construction and desired playing performance properties of the golf ball.

Inner Core Composition

In general, foam compositions are made by forming gas bubbles in a polymer mixture using a foaming (blowing) agent. As the bubbles form, the mixture expands and forms a foam composition that can be molded into an end-use product having either an open or closed cellular structure. Flexible foams generally have an open cell structure, where the cells walls are incomplete and contain small holes through which liquid and air can permeate. Such flexible foams are used traditionally for automobile seats, cushioning, mattresses, and the like. Rigid foams generally have a closed cell structure, where the cell walls are continuous and complete, and are used for used traditionally for automobile panels and parts, building insulation and the like. Many foams contain both open and closed cells. It also is possible to formulate flexible foams having a closed cell structure and likewise to formulate rigid foams having an open cell structure.

Figure 1:
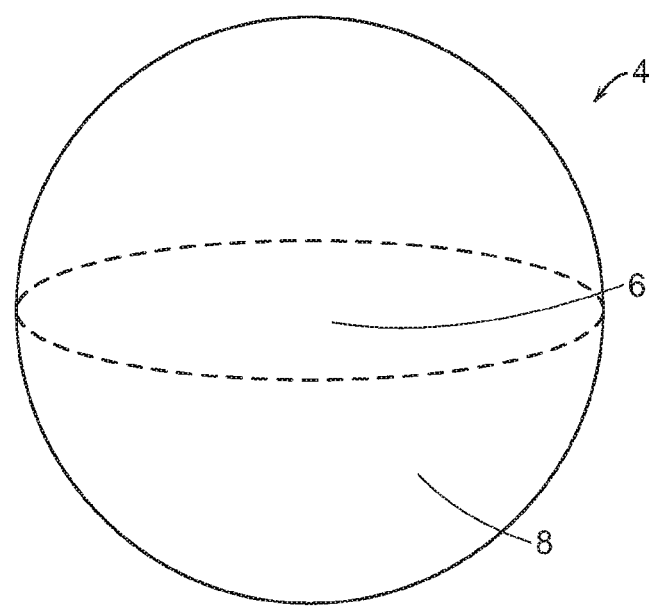
FIG. 1 is a perspective view of a spherical inner core made of a foamed composition in accordance with the present invention.

In the present invention, the inner core (center) comprises a lightweight foam thermoplastic or thermoset polymer composition. The foam may have an open or closed cellular structure or combinations thereof and the foam structure may range from a relatively rigid foam to a very flexible foam. Referring to FIG. 1, a foamed inner core (4) having a geometric center (6) and outer skin (8) may be prepared in accordance with this invention.

A wide variety of thermoplastic and thermoset materials may be used in forming the foam composition of this invention including, for example, polyurethanes; polyureas; copolymers, blends and hybrids of polyurethane and polyurea; olefin-based copolymer ionomer resins (for example, Surlyn® ionomer resins and DuPont HPF® 1000 and HPF® 2000, commercially available from DuPont; Iotek® ionomers, commercially available from ExxonMobil Chemical Company; Amplify® IO ionomers of ethylene acrylic acid copolymers, commercially available from Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, commercially available from Arkema Inc; cross-linked trans-polyisoprene and blends thereof; polyester-based thermoplastic elastomers, such as Hytrel®, commercially available from DuPont or RiteFlex®, commercially available from Ticona Engineering Polymers; polyurethane-based thermoplastic elastomers, such as Elastollan®, commercially available from BASF; synthetic or natural vulcanized rubber; and combinations thereof. Castable polyurethanes, polyureas, and hybrids of polyurethanes-polyureas are particularly desirable because these materials can be used to make a golf ball having good playing performance properties as discussed further below. By the term, "hybrids of polyurethane and polyurea," it is meant to include copolymers and blends thereof.

Basically, polyurethane compositions contain urethane linkages formed by the reaction of a multi-functional isocyanate containing two or more NCO groups with a polyol having two or more hydroxyl groups (OH—OH) sometimes in the presence of a catalyst and other additives. Generally, polyurethanes can be produced in a single-step reaction (one-shot) or in a two-step reaction via a prepolymer or quasi-prepolymer. In the one-shot method, all of the components are combined at once, that is, all of the raw ingredients are added to a reaction vessel, and the reaction is allowed to take place. In the prepolymer method, an excess of polyisocyanate is first reacted with some amount of a polyol to form the prepolymer which contains reactive NCO groups. This prepolymer is then reacted again with a chain extender or curing agent polyol to form the final polyurethane. Polyurea compositions, which are distinct from the above-described polyurethanes, also can be formed. In general, polyurea compositions contain urea linkages formed by reacting an isocyanate group (—N═C═O) with an amine group (NH or $NH_2$). Polyureas can be produced in similar fashion to polyurethanes by either a one shot or prepolymer method. In forming a polyurea polymer, the polyol would be substituted with a suitable polyamine. Hybrid compositions containing urethane and urea linkages also may be produced. For example, when polyurethane prepolymer is reacted with amine-terminated curing agents during the chain-extending step, any excess isocyanate groups in the prepolymer will react with the amine groups in the curing agent. The resulting polyurethane-urea composition contains urethane and urea linkages and may be referred to as a hybrid. In another example, a hybrid composition may be produced when a polyurea prepolymer is reacted with a hydroxyl-terminated curing agent. A wide variety of isocyanates, polyols, polyamines, and curing agents can be used to form the polyurethane and polyurea compositions as discussed further below.

To prepare the foamed polyurethane, polyurea, or other polymer composition, a foaming agent is introduced into the polymer formulation. In general, there are two types of foaming agents: physical foaming agents and chemical foaming agents.

Physical Foaming Agents.

These foaming agents typically are gasses that are introduced under high pressure directly into the polymer composition. Chlorofluorocarbons (CFCs) and partially halogenated chlorofluorocarbons are effective, but these compounds are banned in many countries because of their environmental side effects. Alternatively, aliphatic and cyclic hydrocarbon gasses such as isobutene and pentane may be used. Inert gasses, such as carbon dioxide and nitrogen, also are suitable. With physical foaming agents, the isocyanate and polyol compounds react to form polyurethane linkages and the reaction generates heat. Foam cells are generated and as the foaming agent vaporizes, the gas becomes trapped in the cells of the foam.

Chemical Foaming Agents.

These foaming agents typically are in the form of powder, pellets, or liquids and they are added to the composition, where they decompose or react during heating and generate gaseous by-products (for example, nitrogen or carbon dioxide). The gas is dispersed and trapped throughout the composition and foams it. For example, water may be used as the foaming agent. Air bubbles are introduced into the mixture of the isocyanate and polyol compounds and water by high-speed mixing equipment. As discussed in more detail further below, the isocyanates react with the water to generate carbon dioxide which fills and expands the cells created during the mixing process.

Preferably, a chemical foaming agent is used to prepare the foam compositions of this invention. Chemical blowing agents may be inorganic, such as ammonium carbonate and carbonates of alkalai metals, or may be organic, such as azo and diazo compounds, such as nitrogen-based azo compounds. Suitable azo compounds include, but are not limited to, 2,2'-azobis(2-cyanobutane), 2,2'-azobis(methylbutyronitrile), azodicarbonamide, p,p'-oxybis(benzene sulfonyl hydrazide), p-toluene sulfonyl semicarbazide, p-toluene sulfonyl hydrazide. Other foaming agents include any of the Celogens® sold by Crompton Chemical Corporation, and nitroso compounds, sulfonylhydrazides, azides of organic acids and their analogs, triazines, tri- and tetrazole derivatives, sulfonyl semicarbazides, urea derivatives, guanidine derivatives, and esters such as alkoxyboroxines. Also, foaming agents that liberate gasses as a result of chemical interaction between components such as mixtures of acids and metals, mixtures of organic acids and inorganic carbonates, mixtures of nitriles and ammonium salts, and the hydrolytic decomposition of urea may be used. Water is a preferred foaming agent. When added to the polyurethane formulation, water will react with the isocyanate groups and form carbamic acid intermediates. The carbamic acids readily decarboxylate to form an amine and carbon dioxide. The newly formed amine can then further react with other isocyanate groups to form urea linkages and the carbon dioxide forms the bubbles to produce the foam.

During the decomposition reaction of certain chemical foaming agents, more heat and energy is released than is needed for the reaction. Once the decomposition has started, it continues for a relatively long time period. If these foaming agents are used, longer cooling periods are generally required. Hydrazide and azo-based compounds often are used as exothermic foaming agents. On the other hand, endothermic foaming agents need energy for decomposition. Thus, the release of the gasses quickly stops after the supply of heat to the composition has been terminated. If the composition is produced using these foaming agents, shorter cooling periods are needed. Bicarbonate and citric acid-based foaming agents can be used as exothermic foaming agents.

Other suitable foaming agents include expandable gas-containing microspheres. Exemplary microspheres consist of an acrylonitrile polymer shell encapsulating a volatile gas, such as isopentane gas. This gas is contained within the sphere as a blowing agent. In their unexpanded state, the diameter of these hollow spheres range from 10 to 17 μm and have a true density of 1000 to 1300 $kg/m^3$. When heated, the gas inside the shell increases its pressure and the thermoplastic shell softens, resulting in a dramatic increase of the volume of the microspheres. Fully expanded, the volume of the microspheres will increase more than 40 times (typical diameter values would be an increase from 10 to 40 μm), resulting in a true density below 30 $kg/m^3$ (0.25 lbs/gallon). Typical expansion temperatures range from 80-190° C. (176-374° F.). Such expandable microspheres are commercially available as Expancel® from Expancel of Sweden or Akzo Nobel.

As an alternative to chemical and physical foaming agents or in addition to such foaming agents, as described above, other types of fillers that lower the specific gravity of the composition can be used in accordance with this invention. For example, polymeric, ceramic, and glass unfilled microspheres having a density of 0.1 to 1.0 g/cc and an average particle size of 10 to 250 microns can be used to help lower specific gravity of the composition and achieve the desired density and physical properties.

Additionally, BASF polyurethane materials sold under the trade name Cellasto® and Elastocell®, microcellular polyurethanes, Elastopor® H that is a closed-cell polyurethane rigid foam, Elastoflex® W flexible foam systems, Elastoflex®E semiflexible foam systems, Elastofoam® flexible integrally-skinning systems, Elastolit®D/K/R integral rigid foams, Elastopan®S, Elastollan® thermoplastic polyurethane elastomers (TPUs), and the like may be used in accordance with the present invention. Furthermore, BASF closed-cell, pre-expanded thermoplastic (TPU) polyurethane foam, available under the mark, Infinergy™ also may be used to form the foam centers of the golf balls in accordance with this invention. It also is believed these foam materials would be useful in forming non-center foamed layers in a variety of golf ball constructions. Such closed-cell, pre-expanded TPU foams are described in Prissok et al., US Patent Applications 2012/0329892; 2012/0297513; and 2013/0227861; and U.S. Pat. No. 8,282,851 the disclosures of which are hereby incorporated by reference. Bayer also produces a variety of materials sold as Texin® TPUs, Baytec® and Vulkollan® elastomers, Baymer® rigid foams, Baydur® integral skinning foams, Bayfit® flexible foams available as castable, RIM grades, sprayable, and the like that may be used. Additional foam materials that may be used herein include polyisocyanurate foams and a variety of "thermoplastic" foams, which may be cross-linked to varying extents using free-radical (for example, peroxide) or radiation cross-linking (for example, UV, IR, Gamma, EB irradiation). Also, foams may be prepared from polybutadiene, polystyrene, polyolefin (including metallocene and other single site catalyzed polymers), ethylene vinyl acetate (EVA), acrylate copolymers, such as EMA, EBA, Nucrel®-type acid co and terpolymers, ethylene propylene rubber (such as EPR, EPDM, and any ethylene copolymers), styrene-butadiene, and SEBS (any Kraton-type), PVC, PVDC, CPE (chlorinated polyethylene). Epoxy foams, urea-formaldehyde foams, latex foams and sponge, silicone foams, fluoropolymer foams and syntactic foams (hollow sphere filled) also may be used. In particular, silicone foams may be used. For example, the inner core (center) may be made of a silicone foam rubber and the surrounding outer core layer may be made of a non-foamed thermoset or thermoplastic composition. The silicone foam rubber composition has good thermal stability. Thus, the thermoset or thermoplastic composition may be molded more effectively over the inner core, and the chemical and physical properties of the inner core will not degrade substantially In addition to the polymer and foaming agent, the foam composition also may include other ingredients such as, for example, fillers, cross-linking agents, chain extenders, surfactants, dyes and pigments, coloring agents, fluorescent agents, adsorbents, stabilizers, softening agents, impact modifiers, antioxidants, antiozonants, and the like. The formulations used to prepare the polyurethane foam compositions of this invention preferably contain a polyol, polyisocyanate, water, an amine or hydroxyl curing agent, surfactant, and a catalyst as described further below.

Fillers.

The polyurethane foam composition may contain fillers such as, for example, mineral filler particulate. Suitable mineral filler particulates include compounds such as zinc oxide, limestone, silica, mica, barytes, lithopone, zinc sulfide, talc, calcium carbonate, magnesium carbonate, clays, powdered metals and alloys such as bismuth, brass, bronze, cobalt, copper, iron, nickel, tungsten, aluminum, tin, precipitated hydrated silica, fumed silica, mica, calcium metasilicate, barium sulfate, zinc sulfide, lithopone, silicates, silicon carbide, diatomaceous earth, carbonates such as calcium or magnesium or barium carbonate, sulfates such as calcium or magnesium or barium sulfate. Adding fillers to the foam composition provides many benefits including helping improve the stiffness and strength of the composition. The mineral fillers tend to help decrease the size of the foam cells and increase cell density. The mineral fillers also tend to help improve the physical properties of the foam such as hardness, compression set, and tensile strength. However, in the present invention, it is important the concentration of fillers in the foam composition be not so high as to substantially increase the specific gravity (density) of the composition. Particularly, the specific gravity of the inner core is maintained such that is less than the specific gravity of the outer core layer as discussed further below. The foam composition may contain some fillers; provided however, the specific gravity of the foam composition (inner core) is kept less than the composition of the surrounding outer core layer. In one embodiment, the foam composition is substantially free of fillers. In another embodiment, the foam composition contains no fillers and consists of a mixture of polyisocyanate, polyol, and curing agent, surfactant, catalyst, and water, the water being added in sufficient amount to cause the mixture to foam as discussed above.

If filler is added to the foam composition, clay particulate fillers are particularly suitable. The clay particulate fillers include Garamite® mixed mineral thixotropes and Cloisite® and Nanofil® nanoclays, commercially available from Southern Clay Products, Inc., and Nanomax® and Nanomer® nanoclays, commercially available from Nanocor, Inc may be used. Other nano-scale materials such as nanotubes and nanoflakes also may be used. Also, talc particulate (e.g., Luzenac HAR® high aspect ratio talcs, commercially available from Luzenac America, Inc.), glass (e.g., glass flake, milled glass, and microglass), and combinations thereof may be used. Metal oxide fillers have good heat-stability and may be added including, for example, aluminum oxide, zinc oxide, tin oxide, barium sulfate, zinc sulfate, calcium oxide, calcium carbonate, zinc carbonate, barium carbonate, tungsten, tungsten carbide, and lead silicate fillers. Other metal fillers such as, for example, particulate; powders; flakes; and fibers of copper, steel, brass, tungsten, titanium, aluminum, magnesium, molybdenum, cobalt, nickel, iron, lead, tin, zinc, barium, bismuth, bronze, silver, gold, and platinum, and alloys and combinations thereof also may be added to the foam composition.

Surfactants.

The foam composition also may contain surfactants to stabilize the foam and help control the foam cell size and structure. In one preferred version, the foam composition includes silicone surfactant. In general, the silicone surfactant helps regulate the foam cell size and stabilizes the cell walls to prevent the cells from collapsing. As discussed above, the liquid reactants react to form the foam rapidly. The "liquid" foam develops into solid silicone foam in a relatively short period of time. If a silicone surfactant is not added, the gas-liquid interface between the liquid reactants and expanding gas bubbles may not support the stress. As a result, the cell window can crack or rupture and there can be cell wall drainage. In turn, the foam can collapse on itself. Adding a silicone surfactant helps create a surface tension gradient along the gas-liquid interface and helps reduce cell wall drainage. The silicone surfactant has a relatively low surface tension and thus can lower the surface tension of the foam. It is believed the silicone surfactant orients itself the foam cell walls and lowers the surface tension to create the surface tension gradient. Blowing efficiency and nucleation are supported by adding the silicone surfactant and thus more bubbles are created in the system. The silicone surfactant also helps create a greater number of smaller sized foam cells and increases the closed cell content of the foam due to the surfactant's lower surface tension. Thus, the cell structure in the foam is maintained as the as gas is prevented from diffusing out through the cell walls. Along with the decrease in cell size, there is a decrease in thermal conductivity. The resulting foam material also tends to have greater compression strength and modulus. These improved physical properties may be due to the increase in closed cell content and smaller cell size.

As discussed further below, in one preferred embodiment, the specific gravity (density) of the foam inner core is less than the specific gravity of the outer core. If mineral filler or other additives are included in the foam composition, they should not be added in an amount that would increase the specific gravity (density) of the foam inner core to a level such that it would be greater than the specific gravity of the outer core layer. If the ball's mass is concentrated towards the outer surface (for example, outer core layers), and the outer core layer has a higher specific gravity than the inner core, the ball has a relatively high Moment of Inertia (MOI). In such balls, most of the mass is located away from the ball's axis of rotation and thus more force is needed to generate spin. These balls have a generally low spin rate as the ball leaves the club's face after contact between the ball and club. Such core structures (wherein the specific gravity of the outer core is greater than the specific gravity of the inner core) is preferred in the present invention. Thus, in one preferred embodiment, the concentration of mineral filler particulate in the foam composition is in the range of about 0.1 to about 9.0% by weight.

Properties of Polyurethane Foams

The polyurethane foam compositions of this invention have numerous chemical and physical properties making them suitable for core assemblies in golf balls. For example, there are properties relating to the reaction of the isocyanate and polyol components and blowing agent, particularly "cream time," "gel time," "rise time," "tack-free time," and "free-rise density." In general, cream time refers to the time period from the point of mixing the raw ingredients together to the point where the mixture turns cloudy in appearance or changes color and begins to rise from its initial stable state. Normally, the cream time of the foam compositions of this invention is within the range of about 20 to about 240 seconds. In general, gel time refers to the time period from the point of mixing the raw ingredients together to the point where the expanded foam starts polymerizing/gelling. Rise time generally refers to the time period from the point of mixing the raw ingredients together to the point where the reacted foam has reached its largest volume or maximum height. The rise time of the foam compositions of this invention typically is in the range of about 60 to about 360 seconds. Tack-free time generally refers to the time it takes for the reacted foam to lose its tackiness, and the foam compositions of this invention normally have a tack-free time of about 60 to about 3600 seconds. Free-rise density refers to the density of the resulting foam when it is allowed to rise unrestricted without a cover or top being placed on the mold.

The density of the foam is an important property and is defined as the weight per unit volume (typically, $g/cm^3$) and can be measured per ASTM D-1622. The hardness, stiffness, and load-bearing capacity of the foam are independent of the foam's density, although foams having a high density typically have high hardness and stiffness. Normally, foams having higher densities have higher compression strength. Surprisingly, the foam compositions used to produce the inner core of the golf balls per this invention have a relatively low density; however, the foams are not necessarily soft and flexible, rather, they may be relatively firm, rigid, or semi-rigid depending upon the desired golf ball properties. Tensile strength, tear-resistance, and elongation generally refer to the foam's ability to resist breaking or tearing, and these properties can be measured per ASTM D-1623. The durability of foams is important, because introducing fillers and other additives into the foam composition can increase the tendency of the foam to break or tear apart. In general, the tensile strength of the foam compositions of this invention is in the range of about 20 to about 1000 psi (parallel to the foam rise) and about 50 to about 1000 psi (perpendicular to the foam rise) as measured per ASTM D-1623 at 23° C. and 50% relative humidity (RH). Meanwhile, the flex modulus of the foams of this invention is generally in the range of about 5 to about 45 kPa as measured per ASTM D-790, and the foams generally have a compressive modulus of 200 to 50,000 psi.

In another test, compression strength is measured on an Instron machine according to ASTM D-1621. The foam is cut into blocks and the compression strength is measured as the force required to compress the block by 10%. In general, the compressive strength of the foam compositions of this invention is in the range of about 100 to about 1800 psi (parallel and perpendicular to the foam rise) as measured per ASTM D-1621 at 23° C. and 50% relative humidity (RH). The test is conducted perpendicular to the rise of the foam or parallel to the rise of the foam. The Percentage (%) of Compression Set also can be used. This is a measure of the permanent deformation of a foam sample after it has been compressed between two metal plates under controlled time and temperature condition (standard—22 hours at 70° C. (158° F.)). The foam is compressed to a thickness given as a percentage of its original thickness that remained "set." Preferably, the Compression Set of the foam is less than ten percent (10%), that is, the foam recovers to a point of 90% or greater of its original thickness.

Methods of Preparing the Foam Composition

The foam compositions of this invention may be prepared using different methods. In one preferred embodiment, the method involves preparing a castable composition comprising a reactive mixture of a polyisocyanate, polyol, water, curing agent, surfactant, and catalyst. A motorized mixer can be used to mix the starting ingredients together and form a reactive liquid mixture. Alternatively, the ingredients can be manually mixed together. An exothermic reaction occurs when the ingredients are mixed together and this continues as the reactive mixture is dispensed into the mold cavities (otherwise referred to as half-molds or mold cups). The mold cavities may be referred to as first and second, or upper and lower, mold cavities. The mold cavities preferably are made of metal such as, for example, brass or silicon bronze.

Figure 2:
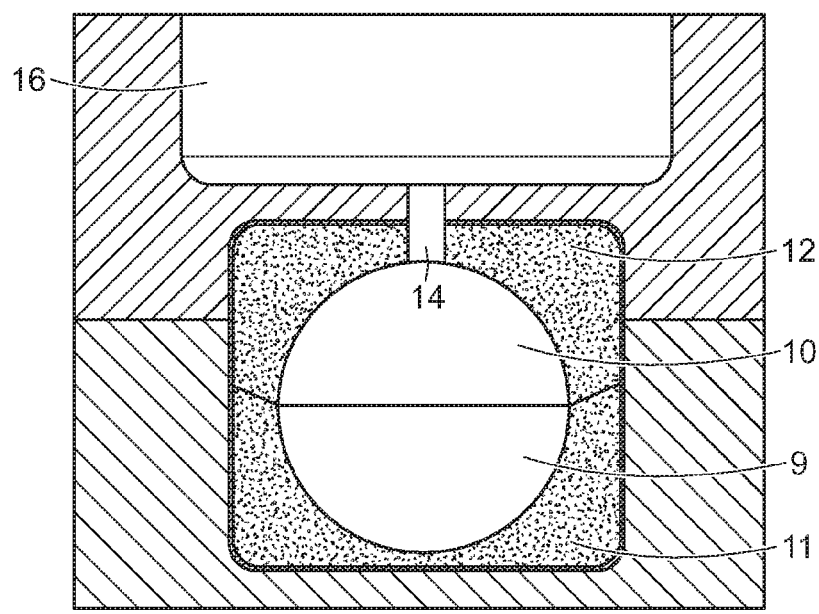
FIG. 2 is a perspective view of one embodiment of upper and lower mold cavities used to make the dual-layered cores of the present invention.

Referring to FIG. 2, the mold cavities are generally indicated at (9) and (10). The lower and upper mold cavities (9, 10) are placed in lower and upper mold frame plates (11, 12). The frame plates (11, 12) contain guide pins and complementary alignment holes (not shown in drawing). The guide pins are inserted into the alignment holes to secure the lower plate (11) to the upper plate (12). The lower and upper mold cavities (9, 10) are mated together as the frame plates (11, 12) are fastened. When the lower and upper mold cavities (9, 10) are joined together, they define an interior spherical cavity that houses the spherical core. The upper mold contains a vent or hole (14) to allow for the expanding foam to fill the cavities uniformly. A secondary overflow chamber (16), which is located above the vent (14), can be used to adjust the amount of foam overflow and thus adjust the density of the core structure being molded in the cavities. As the lower and upper mold cavities (9, 10) are mated together and sufficient heat and pressure is applied, the foamed composition cures and solidifies to form a relatively rigid and lightweight spherical core. The resulting cores are cooled and then removed from the mold.

Hardness of the Inner Core

As shown in FIG. 1, a foamed inner core (4) having a geometric center (6) and outer skin (8) may be prepared per the molding method discussed above. The outer skin (8) is generally a non-foamed region that forms the outer surface of the core structure. The resulting inner core preferably has a diameter within a range of about 0.100 to about 1.100 inches. For example, the inner core may have a diameter within a range of about 0.250 to about 1.000 inches. In another example, the inner core may have a diameter within a range of about 0.300 to about 0.800 inches. More particularly, the inner core preferably has a diameter size with a lower limit of about 0.10 or 0.12 or 0.15 or 0.17 or 0.25 or 0.30 or 0.35 or 0.38 or 0.45 or 0.50 or 0.52 or 0.55 inches and an upper limit of about 0.60 or 0.63 or 0.65 or 0.70 or 0.74 or 0.80 or 0.86 or 0.90 or 0.95 or 1.00 or 1.02 or 1.10 inches. The outer skin (8) of the inner core is relatively thin preferably having a thickness of less than about 0.020 inches and more preferably less than 0.010 inches. In one preferred embodiment, the foamed core has a "positive" hardness gradient (that is, the outer skin of the inner core is harder than its geometric center.)

For example, the geometric center hardness of the inner core ($H_{inner\ core\ center}$), as measured in Shore C units, may be about 10 Shore C or greater and preferably has a lower limit of about 10 or 13 or 16 or 20 or 25 or 30 or 32 or 34 or 36 or 40 Shore C and an upper limit of about 42 or 44 or 48 or 50 or 52 or 56 or 60 or 62 or 65 or 68 or 70 or 74 or 78 or 80 or 84 or 90 Shore C. In one preferred version, the geometric center hardness of the inner core ($H_{inner\ core\ center}$) is about 40 Shore C.

When a flexible, relatively soft foam is used, the ($H_{inner\ core\ center}$) of the foam may have a Shore A hardness of about 10 or greater, and preferably has a lower limit of 15, 18, 20, 25, 28, 30, 35, 38, or 40 Shore A hardness and an upper limit of about 45 or 48, or 50, 54, 58, 60, 65, 70, 80, 85, or 90 Shore A hardness. In one preferred embodiment, the ($H_{inner\ core\ center}$) of the foam is about 55 Shore A.

The $H_{inner\ core\ center}$, as measured in Shore D units, is about 15 Shore D or greater and more preferably within a range having a lower limit of about 15 or 18 or 20 or 22 or 25 or 28 or 30 or 32 or 36 or 40 or 44 Shore D and an upper limit of about 45 or 48 or 50 or 52 or 55 or 58 or 60 or 62 or 64 or 66 or 70 or 72 or 74 or 78 or 80 or 82 or 84 or 88 or 90 Shore D.

Meanwhile, the outer surface hardness of the inner core ($H_{inner\ core\ surface}$), as measured in Shore C, is preferably about 20 Shore C or greater and may have, for example, a lower limit of about 10 or 14 or 17 or 20 or 22 or 24 or 28 or 30 or 32 or 35 or 36 or 40 or 42 or 44 or 48 or 50 Shore C and an upper limit of about 52 or 55 or 58 or 60 or 62 or 64 or 66 or 70 or 74 or 78 or 80 or 86 or 88 or 90 or 92 or 95 Shore C. When a flexible, relatively soft foam is used, the ($H_{inner\ core\ surface}$) of the foam may have a Shore A hardness of about 12 or greater, and preferably has a lower limit of 12, 16, 20, 24, 26, 28, 30, 34, 40, 42, 46, or 50 Shore A hardness and an upper limit of about 52, 55, 58, 60, 62, 66, 70, 74, 78, 80, 84, 88, 90, or 92 Shore A hardness. In one preferred embodiment, the ($H_{inner\ core\ surface}$) is about 60 Shore A. The ($H_{inner\ core\ surface}$), as measured in Shore D units, preferably has a lower limit of about 25 or 28 or 30 or 32 or 36 or 40 or 44 Shore D and an upper limit of about 45 or 48 or 50 or 52 or 55 or 58 or 60 or 62 or 64 or 66 or 70 or 74 or 78 or 80 or 82 or 84 or 88 or 90 or 94 or 96 Shore D.

Density of the Inner Core

The foamed inner core preferably has a specific gravity of about 0.20 to about 1.00 g/cc. That is, the density of the inner core (as measured at any point of the inner core structure) is preferably within the range of about 0.20 to about 1.00 g/cc. By the term, "specific gravity of the inner core" ("$SG_{inner}$"), it is generally meant the specific gravity of the inner core as measured at any point of the inner core structure. It should be understood, however, that the specific gravity values, as taken at different particular points of the inner core structure, may vary. For example, the foamed inner core may have a "positive" density gradient (that is, the outer surface (skin) of the inner core may have a density greater than the geometric center of the inner core.) In one preferred version, the specific gravity of the geometric center of the inner core ($SG_{center\ of\ inner\ core}$) is less than 0.80 g/cc and more preferably less than 0.70 g/cc. More particularly, in one version, the ($SG_{center\ of\ inner\ core}$) is in the range of about 0.10 to about 0.06 g/cc. For example, the ($SG_{center\ of\ inner\ core}$) may be within a range having a lower limit of about 0.10 or 0.15 of 0.20 or 0.24 or 0.30 or 0.35 or 0.37 or 0.40 or 0.42 or 0.45 or 0.47 or 0.50 and an upper limit of about 0.60 or 0.65 or 0.70 or 0.74 or 0.78 or 0.80, or 0.82 or 0.84 or 0.85 or 0.88 or 0.90 g/cc. Meanwhile, the specific gravity of the outer surface (skin) of the inner core ($SG_{skin\ of\ inner\ core}$), in one preferred version, is greater than about 0.90 g/cc and more preferably greater than 1.00 g/cc. For example, the ($SG_{skin\ of\ inner\ core}$) may fall within the range of about 0.90 to about 1.25 g/cc. More particularly, in one version, the ($SG_{skin\ of\ inner\ core}$) may have a specific gravity with a lower limit of about 0.90 or 0.92 or 0.95 or 0.98 or 1.00 or 1.02 or 1.06 or 1.10 g/cc and an upper limit of about 1.12 or 1.15 or 1.18 or 1.20 or 1.24 or 1.30 or 1.32 or 1.35 g/cc. In other instances, the outer skin may have a specific gravity of less than 0.90 g/cc. For example, the specific gravity of the outer skin ($SG_{skin\ of\ inner\ core}$) may be about 0.75 or 0.80 or 0.82 or 0.85 or 0.88 g/cc. In such instances, wherein both the ($SG_{center\ of\ inner\ core}$) and ($SG_{skin\ of\ inner\ core}$) are less than 0.90 g/cc, it is still preferred that the ($SG_{center\ of\ inner\ core}$) be less than the ($SG_{skin\ of\ inner\ core}$).

Polyisocyanates and Polyols for Making the Polyurethane Foams

As discussed above, in one preferred embodiment, a foamed polyurethane composition is used to form the inner core. In general, the polyurethane compositions contain urethane linkages formed by reacting an isocyanate group (—N=C=O) with a hydroxyl group (OH). The polyurethanes are produced by the reaction of multi-functional isocyanates containing two or more isocyanate groups with a polyol having two or more hydroxyl groups. The formulation may also contain a catalyst, surfactant, and other additives.

In particular, the foam inner core of this invention may be prepared from a composition comprising an aromatic polyurethane, which is preferably formed by reacting an aromatic diisocyanate with a polyol. Suitable aromatic diisocyanates that may be used in accordance with this invention include, for example, toluene 2,4-diisocyanate (TDI), toluene 2,6-diisocyanate (TDI), 4,4'-methylene diphenyl diisocyanate (MDI), 2,4'-methylene diphenyl diisocyanate (MDI), polymeric methylene diphenyl diisocyanate (PMDI), p-phenylene diisocyanate (PPDI), m-phenylene diisocyanate (PDI), naphthalene 1,5-diisocyanate (NDI), naphthalene 2,4-diisocyanate (NDI), p-xylene diisocyanate (XDI), and homopolymers and copolymers and blends thereof. The aromatic isocyanates are able to react with the hydroxyl or amine compounds and form a durable and tough polymer having a high melting point. The resulting polyurethane generally has good mechanical strength and tear-resistance.

Alternatively, the foamed composition of the inner core may be prepared from a composition comprising aliphatic polyurethane, which is preferably formed by reacting an aliphatic diisocyanate with a polyol. Suitable aliphatic diisocyanates that may be used in accordance with this invention include, for example, isophorone diisocyanate (IPDI), 1,6-hexamethylene diisocyanate (HDI), 4,4'-dicyclohexylmethane diisocyanate ("$H_{12}$ MDI"), meta-tetramethylxylyene diisocyanate (TMXDI), trans-cyclohexane diisocyanate (CHDI), 1,3-bis(isocyanatomethyl)cyclohexane; 1,4-bis(isocyanatomethyl)cyclohexane; and homopolymers and copolymers and blends thereof. The resulting polyurethane generally has good light and thermal stability. Preferred polyfunctional isocyanates include 4,4'-methylene diphenyl diisocyanate (MDI), 2,4'-methylene diphenyl diisocyanate (MDI), and polymeric MDI having a functionality in the range of 2.0 to 3.5 and more preferably 2.2 to 2.5.

Any suitable polyol may be used to react with the polyisocyanate in accordance with this invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol (PTMEG), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

As discussed further below, chain extenders (curing agents) are added to the mixture to build-up the molecular weight of the polyurethane polymer. In general, hydroxyl-terminated curing agents, amine-terminated curing agents, and mixtures thereof are used.

A catalyst may be employed to promote the reaction between the isocyanate and polyol compounds. Suitable catalysts include, but are not limited to, bismuth catalyst; zinc octoate; tin catalysts such as bis-butyltin dilaurate, bis-butyltin diacetate, stannous octoate; tin (II) chloride, tin (IV) chloride, bis-butyltin dimethoxide, dimethyl-bis[1-oxonedecyl)oxy]stannane, di-n-octyltin bis-isooctyl mercaptoacetate; amine catalysts such as triethylenediamine, triethylamine, tributylamine, 1,4-diaza(2,2,2)bicyclooctane, tetramethylbutane diamine, bis[2-dimethylaminoethyl] ether, N,N-dimethylaminopropylamine, N,N-dimethylcyclohexylamine, N,N,N',N',N"-pentamethyldiethylenetriamine, diethanolamine, dimethtlethanolamine, N-[2-(dimethylamino)ethyl]-N-methylethanolamine, N-ethylmorpholine, 3-dimethylamino-N,N-dimethylpropionamide, and N,N',N"-dimethylaminopropylhexahydrotriazine; organic acids such as oleic acid and acetic acid; delayed catalysts; and mixtures thereof. Zirconium-based catalysts such as, for example, bis(2-dimethyl aminoethyl)ether; mixtures of zinc complexes and amine compounds such as KKAT™ XK 614, available from King Industries; and amine catalysts such as Niax™ A-2 and A-33, available from Momentive Specialty Chemicals, Inc. are particularly preferred. The catalyst is preferably added in an amount sufficient to catalyze the reaction of the components in the reactive mixture. In one embodiment, the catalyst is present in an amount from about 0.001 percent to about 1 percent, and preferably 0.1 to 0.5 percent, by weight of the composition.

In one preferred embodiment, as described above, water is used as the foaming agent—the water reacts with the polyisocyanate compound(s) and forms carbon dioxide gas which induces foaming of the mixture. The reaction rate of the water and polyisocyanate compounds affects how quickly the foam is formed as measured per reaction profile properties such as cream time, gel time, and rise time of the foam.

The hydroxyl chain-extending (curing) agents are preferably selected from the group consisting of ethylene glycol; diethylene glycol; polyethylene glycol; propylene glycol; 2-methyl-1,3-propanediol; 2-methyl-1,4-butanediol; monoethanolamine; diethanolamine; triethanolamine; monoisopropanolamine; diisopropanolamine; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N',N'-tetra-(2-hydroxypropyl)-ethylene diamine; diethylene glycol bis-(aminopropyl)ether; 1,5-pentanediol; 1,6-hexanediol; 1,3-bis-(2-hydroxyethoxy)cyclohexane; 1,4-cyclohexyldimethylol; 1,3-bis-[2-(2-hydroxyethoxy)ethoxy]cyclohexane; 1,3-bis-{2-[2-(2-hydroxyethoxy)ethoxy]ethoxy}cyclohexane; trimethylolpropane; polytetramethylene ether glycol (PTMEG), preferably having a molecular weight from about 250 to about 3900; and mixtures thereof. Di, tri, and tetra-functional polycaprolactone diols such as, 2-oxepanone polymer initiated with 1,4-butanediol, 2-ethyl-2-(hydroxymethyl)-1,3-propanediol, or 2,2-bis(hydroxymethyl)-1,3-propanediol such, may be used.

Suitable amine chain-extending (curing) agents that can be used in chain-extending the polyurethane prepolymer include, but are not limited to, unsaturated diamines such as 4,4'-diamino-diphenylmethane (i.e., 4,4'-methylene-dianiline or "MDA"), m-phenylenediamine, p-phenylenediamine, 1,2- or 1,4-bis(sec-butylamino)benzene, 3,5-diethyl-(2,4- or 2,6-)toluenediamine or "DETDA", 3,5-dimethylthio-(2,4- or 2,6-)toluenediamine, 3,5-diethylthio-(2,4- or 2,6-)toluenediamine, 3,3'-dimethyl-4,4'-diamino-diphenylmethane, 3,3'-diethyl-5,5'-dimethyl4,4'-diamino-diphenylmethane (i.e., 4,4'-methylene-bis(2-ethyl-6-methyl-benezeneamine)), 3,3'-dichloro-4,4'-diamino-diphenylmethane (i.e., 4,4'-methylene-bis(2-chloroaniline) or "MOCA"), 3,3',5,5'-tetraethyl-4,4'-diamino-diphenylmethane (i.e., 4,4'-methylene-bis(2,6-diethylaniline), 2,2'-dichloro-3,3',5,5'-tetraethyl-4,4'-diamino-diphenylmethane (i.e., 4,4'-methylene-bis(3-chloro-2,6-diethyleneaniline) or "MCDEA"), 3,3'-diethyl-5,5'-dichloro-4,4'-diamino-diphenylmethane, or "MDEA"), 3,3'-dichloro-2,2',6,6'-tetraethyl-4,4'-diamino-diphenylmethane, 3,3'-dichloro-4,4'-diamino-diphenylmethane, 4,4'-methylene-bis(2,3-dichloroaniline) (i.e., 2,2',3,3'-tetrachloro-4,4'-diamino-diphenylmethane or "MDCA"), 4,4'-bis(sec-butylamino)-diphenylmethane, N,N'-dialkylamino-diphenylmethane, trimethyleneglycol-di(p-aminobenzoate), polyethyleneglycol-di(p-aminobenzoate), polytetramethyleneglycol-di(p-aminobenzoate); saturated diamines such as ethylene diamine, 1,3-propylene diamine, 2-methyl-pentamethylene diamine, hexamethylene diamine, 2,2,4- and 2,4,4-trimethyl-1,6-hexane diamine, imino-bis(propylamine), imido-bis(propylamine), methyl-imino-bis(propylamine) (i.e., N-(3-aminopropyl)-N-methyl-1,3-propanediamine), 1,4-bis(3-aminopropoxy)butane (i.e., 3,3'-[1,4-butanediylbis-(oxy)bis]-1-propanamine), diethyleneglycol-bis(propylamine) (i.e., diethyleneglycol-di (aminopropyl)ether), 4,7,10-trioxatridecane-1,13-diamine, 1-methyl-2,6-diamino-cyclohexane, 1,4-diamino-cyclohexane, poly(oxyethylene-oxypropylene)diamines, 1,3- or 1,4-bis(methylamino)-cyclohexane, isophorone diamine, 1,2- or 1,4-bis(sec-butylamino)-cyclohexane, N,N'-diisopropyl-isophorone diamine, 4,4'-diamino-dicyclohexylmethane, 3,3'-dimethyl-4,4'-diamino-dicyclohexylmethane, 3,3'-dichloro-4,4'-diamino-dicyclohexylmethane, N,N'-dialkylamino-dicyclohexylmethane, polyoxyethylene diamines, 3,3'-diethyl-5,5'-dimethyl-4,4'-diamino-dicyclohexylmethane, polyoxypropylene diamines, 3,3'-diethyl-5,5'-dichloro-4,4'-diamino-dicyclohexylmethane, polytetramethylene ether diamines, 3,3',5,5 '-tetraethyl-4,4'-diamino-dicyclohexylmethane (i.e., 4,4'-methylene-bis(2,6-diethylaminocyclohexane)), 3,3'-dichloro-4,4'-diamino-dicyclohexylmethane, 2,2'-dichloro-3,3',5,5'-tetraethyl-4,4'-diamino-dicyclohexylmethane, (ethylene oxide)-capped polyoxypropylene ether diamines, 2,2',3,3'-tetrachloro-4,4'-diamino-dicyclohexylmethane, 4,4'-bis(sec-butylamino)-dicyclohexylmethane; triamines such as diethylene triamine, dipropylene triamine, (propylene oxide)-based triamines (i.e., polyoxypropylene triamines), N-(2-aminoethyl)-1,3-propylenediamine (i.e., $N_3$-amine), glycerin-based triamines, (all saturated); tetramines such as N,N'-bis(3-aminopropyl)ethylene diamine (i.e., $N_4$-amine) (both saturated), triethylene tetramine; and other polyamines such as tetraethylene pentamine (also saturated). One suitable amine-terminated chain-extending agent is Ethacure 300™ (dimethylthiotoluenediamine or a mixture of 2,6-diamino-3,5-dimethylthiotoluene and 2,4-diamino-3,5-dimethylthiotoluene.) The amine curing agents used as chain extenders normally have a cyclic structure and a low molecular weight (250 or less).

When a hydroxyl-terminated curing agent is used, the resulting polyurethane composition contains urethane linkages. On the other hand, when an amine-terminated curing agent is used, any excess isocyanate groups will react with the amine groups in the curing agent. The resulting polyurethane composition contains urethane and urea linkages and may be referred to as a polyurethane/urea hybrid.

Core Compositions

As discussed above, a two-layered or dual-core is preferably made, wherein the inner core (center) is surrounded by an outer core layer, and the center is made from a foamed composition. In one preferred embodiment, the outer core layer is made from a non-foamed thermoset composition and more preferably from a non-foamed thermoset rubber composition.

Suitable thermoset rubber materials that may be used to form the outer core layer include, but are not limited to, polybutadiene, polyisoprene, ethylene propylene rubber ("EPR"), ethylene-propylene-diene ("EPDM") rubber, styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and blends of two or more thereof. Preferably, the outer core layer is formed from a polybutadiene rubber composition.

The thermoset rubber composition may be cured using conventional curing processes. Suitable curing processes include, for example, peroxide-curing, sulfur-curing, high-energy radiation, and combinations thereof. Preferably, the rubber composition contains a free-radical initiator selected from organic peroxides, high energy radiation sources capable of generating free-radicals, and combinations thereof. In one preferred version, the rubber composition is peroxide-cured. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel. Peroxide free-radical initiators are generally present in the rubber composition in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubbers, and an upper limit of 2.5 parts or 3 parts or 5 parts or 6 parts or 10 parts or 15 parts by weight per 100 parts of the total rubber. Concentrations are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

The rubber compositions may further include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particular examples of suitable metal salts include, but are not limited to, one or more metal salts of acrylates, diacrylates, methacrylates, and dimethacrylates, wherein the metal is selected from magnesium, calcium, zinc, aluminum, lithium, and nickel. In a particular embodiment, the co-agent is selected from zinc salts of acrylates, diacrylates, methacrylates, and dimethacrylates. In another particular embodiment, the agent is zinc diacrylate (ZDA). When the co-agent is zinc diacrylate and/or zinc dimethacrylate, the co-agent is typically included in the rubber composition in an amount within the range having a lower limit of 1 or 5 or 10 or 15 or 19 or 20 parts by weight per 100 parts of the total rubber, and an upper limit of 24 or 25 or 30 or 35 or 40 or 45 or 50 or 60 parts by weight per 100 parts of the base rubber.

Radical scavengers such as a halogenated organosulfur, organic disulfide, or inorganic disulfide compounds may be added to the rubber composition. These compounds also may function as "soft and fast agents." As used herein, "soft and fast agent" means any compound or a blend thereof that is capable of making a core: 1) softer (having a lower compression) at a constant "coefficient of restitution" (COR); and/or 2) faster (having a higher COR at equal compression), when compared to a core equivalently prepared without a soft and fast agent. Preferred halogenated organosulfur compounds include, but are not limited to, pentachlorothiophenol (PCTP) and salts of PCTP such as zinc pentachlorothiophenol (ZnPCTP). Using PCTP and ZnPCTP in golf ball inner cores helps produce softer and faster inner cores. The PCTP and ZnPCTP compounds help increase the resiliency and the coefficient of restitution of the core. In a particular embodiment, the soft and fast agent is selected from ZnPCTP, PCTP, ditolyl disulfide, diphenyl disulfide, dixylyl disulfide, 2-nitroresorcinol, and combinations thereof.

In addition, the rubber compositions may include antioxidants. Also, processing aids such as high molecular weight organic acids and salts thereof may be added to the composition. Other ingredients such as accelerators, dyes and pigments, wetting agents, surfactants, plasticizers, coloring agents, fluorescent agents, stabilizers, softening agents, impact modifiers, antiozonants, as well as other additives known in the art may be added to the rubber composition. The rubber composition also may include filler(s) such as materials selected from carbon black, clay and nanoclay particles as discussed above, talc (e.g., Luzenac HAR® high aspect ratio talcs, commercially available from Luzenac America, Inc.), glass (e.g., glass flake, milled glass, and microglass), mica and mica-based pigments (e.g., Iriodin® pearl luster pigments, commercially available from The Merck Group), and combinations thereof. Metal fillers such as, for example, particulate; powders; flakes; and fibers of copper, steel, brass, tungsten, titanium, aluminum, magnesium, molybdenum, cobalt, nickel, iron, lead, tin, zinc, barium, bismuth, bronze, silver, gold, and platinum, and alloys and combinations thereof also may be added to the rubber composition to adjust the specific gravity of the composition as needed. As discussed further below, in one preferred embodiment, the inner core layer has a specific gravity (density) less than the outer core layer's specific gravity; and, the inner cover layer has a specific gravity greater than the outer core layer's specific gravity. Thus, if filler is added to the polybutadiene rubber composition (or other thermoset material) used to form the outer core layer, the concentration of fillers is such that the specific gravity of the outer core remains greater than the specific gravity of the inner core. However, at the same time, the concentration of fillers should not be excessive so as to substantially increase the specific gravity of the composition making the outer core layer's specific gravity greater than the inner cover layer's specific gravity. In other words, the specific gravity of the outer core is maintained such that is greater than the specific gravity of the inner core layer; while at the same time, it less than the specific gravity of the inner cover layer. The polybutadiene rubber composition may contain some fillers; provided however, the specific gravity of the rubber composition (outer core) is kept less than the composition of the inner cover layer. In one embodiment, the polybutadiene rubber composition is substantially free of inert fillers. In another embodiment, the polybutadiene composition contains no inert fillers and consists of a mixture of polybutadiene rubber, free-radical initiator, cross-linking co-agent, and soft and fast agent as discussed above.

Examples of commercially-available polybutadiene rubbers that can be used in accordance with this invention, include, but are not limited to, BR 01 and BR 1220, available from BST Elastomers of Bangkok, Thailand; SE BR 1220LA and SE BR1203, available from DOW Chemical Co of Midland, Mich.; BUDENE 1207, 1207s, 1208, and 1280 available from Goodyear, Inc of Akron, Ohio; BR 01, 51 and 730, available from Japan Synthetic Rubber (JSR) of Tokyo, Japan; BUNA CB 21, CB 22, CB 23, CB 24, CB 25, CB 29 MES, CB 60, CB Nd 60, CB 55 NF, CB 70 B, CB KA 8967, and CB 1221, available from Lanxess Corp. of Pittsburgh. Pa.; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEOCIS BR 60, INTENE 60 AF and P30AF, and EUROPRENE BR HV80, available from Polimeri Europa of Rome, Italy; AFDENE 50 and NEODENE BR40, BR45, BR50 and BR60, available from Karbochem (PTY) Ltd. of Bruma, South Africa; KBR 01, NdBr 40, NdBR-45, NdBr 60, KBR 710S, KBR 710H, and KBR 750, available from Kumho Petrochemical Co., Ltd. Of Seoul, South Korea; DIENE 55NF, 70AC, and 320 AC, available from Firestone Polymers of Akron, Ohio; and PBR-Nd Group II and Group III, available from Nizhnekamskneftekhim, Inc. of Nizhnekamsk, Tartarstan Republic.

The polybutadiene rubber is used in an amount of at least about 5% by weight based on total weight of composition and is generally present in an amount of about 5% to about 100%, or an amount within a range having a lower limit of 5% or 10% or 20% or 30% or 40% or 50% and an upper limit of 55% or 60% or 70% or 80% or 90% or 95% or 100%. Preferably, the concentration of polybutadiene rubber is about 40 to about 95 weight percent. If desirable, lesser amounts of other thermoset materials may be incorporated into the base rubber. Such materials include the rubbers discussed above, for example, cis-polyisoprene, trans-polyisoprene, balata, polychloroprene, polynorbornene, polyoctenamer, polypentenamer, butyl rubber, EPR, EPDM, styrene-butadiene, and the like.

As discussed above, in one preferred embodiment, a thermoset rubber composition is used to form the outer core. In alternative embodiments, the outer core layer is made from a thermoplastic material, for example, an ionomer composition.

Suitable ionomer compositions include partially-neutralized ionomers and highly-neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers. For purposes of the present disclosure, "HNP" refers to an acid copolymer after at least 70% of all acid groups present in the composition are neutralized.

Preferred ionomers are salts of O/X- and O/X/Y-type acid copolymers, wherein O is an $\alpha$-olefin, X is a $C_3$-$C_8$ $\alpha,\beta$-ethylenically unsaturated carboxylic acid, and Y is a softening monomer. O is preferably selected from ethylene and propylene. X is preferably selected from methacrylic acid, acrylic acid, ethacrylic acid, crotonic acid, and itaconic acid. Methacrylic acid and acrylic acid are particularly preferred. Y is preferably selected from (meth)acrylate and alkyl (meth)acrylates wherein the alkyl groups have from 1 to 8 carbon atoms, including, but not limited to, n-butyl (meth)acrylate, isobutyl (meth)acrylate, methyl (meth)acrylate, and ethyl (meth)acrylate.

Preferred O/X and O/X/Y-type copolymers include, without limitation, ethylene acid copolymers, such as ethylene/(meth)acrylic acid, ethylene/(meth)acrylic acid/maleic anhydride, ethylene/(meth)acrylic acid/maleic acid monoester, ethylene/maleic acid, ethylene/maleic acid mono-ester, ethylene/(meth)acrylic acid/n-butyl (meth)acrylate, ethylene/(meth)acrylic acid/iso-butyl (meth)acrylate, ethylene/(meth)acrylic acid/methyl (meth)acrylate, ethylene/(meth)acrylic acid/ethyl (meth)acrylate terpolymers, and the like. The term, "copolymer," as used herein, includes polymers having two types of monomers, those having three types of monomers, and those having more than three types of monomers. Preferred α,β-ethylenically unsaturated mono- or dicarboxylic acids are (meth)acrylic acid, ethacrylic acid, maleic acid, crotonic acid, fumaric acid, itaconic acid. (Meth)acrylic acid is most preferred. As used herein, "(meth)acrylic acid" means methacrylic acid and/or acrylic acid. Likewise, "(meth)acrylate" means methacrylate and/or acrylate.

In a particularly preferred version, highly neutralized E/X- and E/X/Y-type acid copolymers, wherein E is ethylene, X is a $C_3$-$C_8$ α,β-ethylenically unsaturated carboxylic acid, and Y is a softening monomer are used. X is preferably selected from methacrylic acid, acrylic acid, ethacrylic acid, crotonic acid, and itaconic acid. Methacrylic acid and acrylic acid are particularly preferred. Y is preferably an acrylate selected from alkyl acrylates and aryl acrylates and preferably selected from (meth)acrylate and alkyl (meth)acrylates wherein the alkyl groups have from 1 to 8 carbon atoms, including, but not limited to, n-butyl (meth)acrylate, isobutyl (meth)acrylate, methyl (meth)acrylate, and ethyl (meth) acrylate. Preferred E/X/Y-type copolymers are those wherein X is (meth)acrylic acid and/or Y is selected from (meth)acrylate, n-butyl (meth)acrylate, isobutyl (meth)acrylate, methyl (meth)acrylate, and ethyl (meth)acrylate. More preferred E/X/Y-type copolymers are ethylene/(meth)acrylic acid/n-butyl acrylate, ethylene/(meth)acrylic acid/methyl acrylate, and ethylene/(meth)acrylic acid/ethyl acrylate.

The amount of ethylene in the acid copolymer is typically at least 15 wt. %, preferably at least 25 wt. %, more preferably least 40 wt. %, and even more preferably at least 60 wt. %, based on total weight of the copolymer. The amount of $C_3$ to $C_8$ α,β-ethylenically unsaturated mono- or dicarboxylic acid in the acid copolymer is typically from 1 wt. % to 35 wt. %, preferably from 5 wt. % to 30 wt. %, more preferably from 5 wt. % to 25 wt. %, and even more preferably from 10 wt. % to 20 wt. %, based on total weight of the copolymer. The amount of optional softening comonomer in the acid copolymer is typically from 0 wt. % to 50 wt. %, preferably from 5 wt. % to 40 wt. %, more preferably from 10 wt. % to 35 wt. %, and even more preferably from 20 wt. % to 30 wt. %, based on total weight of the copolymer. "Low acid" and "high acid" ionomeric polymers, as well as blends of such ionomers, may be used. In general, low acid ionomers are considered to be those containing 16 wt. % or less of acid moieties, whereas high acid ionomers are considered to be those containing greater than 16 wt. % of acid moieties.

The various O/X, E/X, O/X/Y, and E/X/Y-type copolymers are at least partially neutralized with a cation source, optionally in the presence of a high molecular weight organic acid, such as those disclosed in Rajagopalan et al., U.S. Pat. No. 6,756,436, the entire disclosure of which is hereby incorporated herein by reference. The acid copolymer can be reacted with the optional high molecular weight organic acid and the cation source simultaneously, or prior to the addition of the cation source. Suitable cation sources include, but are not limited to, metal ion sources, such as compounds of alkali metals, alkaline earth metals, transition metals, and rare earth elements; ammonium salts and monoamine salts; and combinations thereof. Preferred cation sources are compounds of magnesium, sodium, potassium, cesium, calcium, barium, manganese, copper, zinc, lead, tin, aluminum, nickel, chromium, lithium, and rare earth metals. The amount of cation used in the composition is readily determined based on desired level of neutralization. As discussed above, for HNP compositions, the acid groups are neutralized to 70% or greater, preferably 70 to 100%, more preferably 90 to 100%. In one embodiment, an excess amount of neutralizing agent, that is, an amount greater than the stoichiometric amount needed to neutralize the acid groups, may be used. That is, the acid groups may be neutralized to 100% or greater, for example 110% or 120% or greater. In other embodiments, partially-neutralized compositions are prepared, wherein 10% or greater, normally 30% or greater of the acid groups are neutralized. When aluminum is used as the cation source, it is preferably used at low levels with another cation such as zinc, sodium, or lithium, since aluminum has a dramatic effect on melt flow reduction and cannot be used alone at high levels. For example, aluminum is used to neutralize about 10% of the acid groups and sodium is added to neutralize an additional 90% of the acid groups.

"Ionic plasticizers" such as organic acids or salts of organic acids, particularly fatty acids, may be added to the ionomer resin. Such ionic plasticizers are used to make conventional ionomer composition more processable as described in the above-mentioned U.S. Pat. No. 6,756,436. In the present invention such ionic plasticizers are optional. In one preferred embodiment, a thermoplastic ionomer composition is made by neutralizing about 70 wt % or more of the acid groups without the use of any ionic plasticizer. On the other hand, in some instances, it may be desirable to add a small amount of ionic plasticizer, provided that it does not adversely affect the heat-resistance properties of the composition. For example, the ionic plasticizer may be added in an amount of about 10 to about 50 weight percent (wt. %) of the composition, more preferably 30 to 55 wt. %.

The organic acids may be aliphatic, mono- or multi-functional (saturated, unsaturated, or multi-unsaturated) organic acids. Salts of these organic acids may also be employed. Suitable fatty acid salts include, for example, metal stearates, laureates, oleates, palmitates, pelargonates, and the like. For example, fatty acid salts such as zinc stearate, calcium stearate, magnesium stearate, barium stearate, and the like can be used. The salts of fatty acids are generally fatty acids neutralized with metal ions. The metal cation salts provide the cations capable of neutralizing (at varying levels) the carboxylic acid groups of the fatty acids. Examples include the sulfate, carbonate, acetate and hydroxide salts of metals such as barium, lithium, sodium, zinc, bismuth, chromium, cobalt, copper, potassium, strontium, titanium, tungsten, magnesium, cesium, iron, nickel, silver, aluminum, tin, or calcium, and blends thereof. It is preferred the organic acids and salts be relatively non-migratory (they do not bloom to the surface of the polymer under ambient temperatures) and non-volatile (they do not volatilize at temperatures required for melt-blending).

Other suitable thermoplastic polymers that may be used to form the inner cover layer include, but are not limited to, the following polymers (including homopolymers, copolymers, and derivatives thereof.)

(a) polyesters, particularly those modified with a compatibilizing group such as sulfonate or phosphonate, including modified poly(ethylene terephthalate), modified poly (butylene terephthalate), modified poly(propylene terephthalate), modified poly(trimethylene terephthalate), modified poly(ethylene naphthenate), and those disclosed in U.S. Pat. Nos. 6,353,050, 6,274,298, and 6,001,930, the entire disclosures of which are hereby incorporated herein by reference, and blends of two or more thereof;

(b) polyamides, polyamide-ethers, and polyamide-esters, and those disclosed in U.S. Pat. Nos. 6,187,864, 6,001,930, and 5,981,654, the entire disclosures of which are hereby incorporated herein by reference, and blends of two or more thereof;

(c) polyurethanes, polyureas, polyurethane-polyurea hybrids, and blends of two or more thereof;

(d) fluoropolymers, such as those disclosed in U.S. Pat. Nos. 5,691,066, 6,747,110 and 7,009,002, the entire disclosures of which are hereby incorporated herein by reference, and blends of two or more thereof;

(e) polystyrenes, such as poly(styrene-co-maleic anhydride), acrylonitrile-butadiene-styrene, poly(styrene sulfonate), polyethylene styrene, and blends of two or more thereof;

(f) polyvinyl chlorides and grafted polyvinyl chlorides, and blends of two or more thereof;

(g) polycarbonates, blends of polycarbonate/acrylonitrile-butadiene-styrene, blends of polycarbonate/polyurethane, blends of polycarbonate/polyester, and blends of two or more thereof;

(h) polyethers, such as polyarylene ethers, polyphenylene oxides, block copolymers of alkenyl aromatics with vinyl aromatics and polyamicesters, and blends of two or more thereof;

(i) polyimides, polyetherketones, polyamideimides, and blends of two or more thereof; and (j) polycarbonate/polyester copolymers and blends.

It also is recognized that thermoplastic materials can be "converted" into thermoset materials by cross-linking the polymer chains so they form a network structure, and such cross-linked thermoplastic materials may be used to form the inner cover layers in accordance with this invention. For example, thermoplastic polyolefins such as linear low density polyethylene (LLDPE), low density polyethylene (LDPE), and high density polyethylene (HDPE) may be cross-linked to form bonds between the polymer chains. The cross-linked thermoplastic material typically has improved physical properties and strength over non-cross-linked thermoplastics, particularly at temperatures above the crystalline melting point. Preferably a partially or fully-neutralized ionomer, as described above, is covalently cross-linked to render it into a thermoset composition (that is, it contains at least some level of covalent, irreversable cross-links). Thermoplastic polyurethanes and polyureas also may be converted into thermoset materials in accordance with the present invention.

Modifications in the thermoplastic polymeric structure of thermoplastics can be induced by a number of methods, including exposing the thermoplastic material to high-energy radiation or through a chemical process using peroxide. Radiation sources include, but are not limited to, gamma-rays, electrons, neutrons, protons, x-rays, helium nuclei, or the like. Gamma radiation, typically using radioactive cobalt atoms and allows for considerable depth of treatment, if necessary. For core layers requiring lower depth of penetration, electron-beam accelerators or UV and IR light sources can be used. Useful UV and IR irradiation methods are disclosed in U.S. Pat. Nos. 6,855,070 and 7,198,576, which are incorporated herein by reference. The thermoplastic core layers may be irradiated at dosages greater than 0.05 Mrd, preferably ranging from 1 Mrd to 20 Mrd, more preferably from 2 Mrd to 15 Mrd, and most preferably from 4 Mrd to 10 Mrd. In one preferred embodiment, the cores are irradiated at a dosage from 5 Mrd to 8 Mrd and in another preferred embodiment, the cores are irradiated with a dosage from 0.05 Mrd to 3 Mrd, more preferably 0.05 Mrd to 1.5 Mrd.

The cross-linked thermoplastic material may be created by exposing the thermoplastic to: 1) a high-energy radiation treatment, such as electron beam or gamma radiation, such as disclosed in U.S. Pat. No. 5,891,973, which is incorporated by reference herein, 2) lower energy radiation, such as ultra-violet (UV) or infra-red (IR) radiation; 3) a solution treatment, such as an isocyanate or a silane; 4) incorporation of additional free radical initiator groups in the thermoplastic prior to molding; and/or 5) chemical modification, such as esterification or saponification, to name a few.

Core Structure

Figure 3:
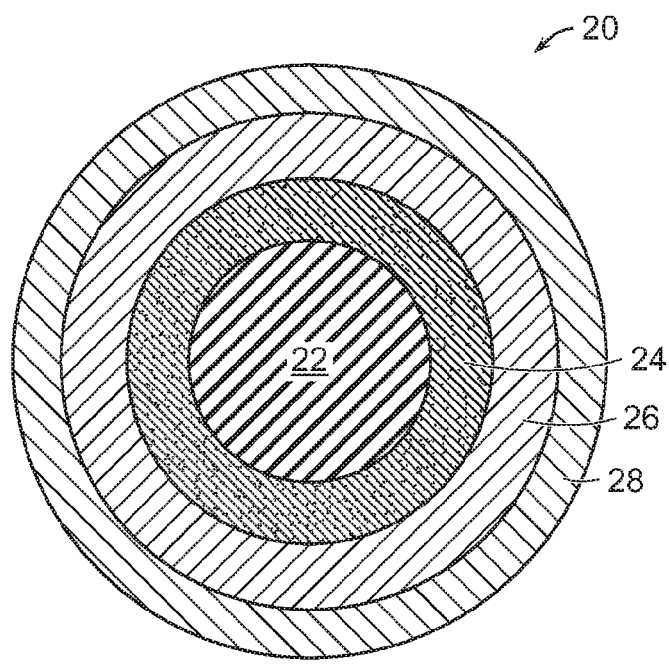
FIG. 3 is a cross-sectional view of a four-piece golf ball having a dual-layered core and dual-layered cover made in accordance with the present invention.

As discussed above, the core of the golf ball of this invention preferably has a dual-layered structure comprising inner (center) and outer core layers. Referring to FIG. 3, one version of a golf ball that can be made in accordance with this invention is generally indicated at (20). The ball (20) contains a dual-layered core having a center (22) and outer core layer (24) surrounded by an inner cover (26). An outer cover (28) is disposed about the inner cover (26). In one embodiment, the inner core (22a) is relatively small in volume and generally has a diameter within a range of about 0.10 to about 1.10 inches. More particularly, the inner core (22a) preferably has a diameter size with a lower limit of about 0.15 or 0.25 or 0.35 or 0.45 or 0.50 or 0.55 inches and an upper limit of about 0.60 or 0.70 or 0.80 or 0.90 inches. In one preferred version, the diameter of the inner core (22a) is in the range of about 0.15 to about 0.80 inches, more preferably about 0.30 to about 0.75 inches. In a particularly preferred version, the diameter of the inner core (22a) is about 0.5 inches. Meanwhile, the outer core layer (22b) generally has a thickness within a range of about 0.10 to about 0.85 inches and preferably has a lower limit of 0.10 or 0.15 or 0.20 or 0.25 or 0.30 or 0.32 or 0.35 or 0.40 or 0.45 inches and an upper limit of 0.50 or 0.52 or 0.60 or 0.65 or 0.68 or 0.70 or 0.75 or 0.78 or 0.80 or 0.85 inches. In one preferred version, the outer core layer has a thickness in the range of about 0.40 to about 0.70 inches, more preferably about 0.50 to about 0.65 inches. In a particularly preferred version, the thickness of the outer core (22b) is about 0.51 inches; and the total diameter of the inner core/outer core sub-assembly is about 1.53 inches.

Specific Gravity (Density) of Core Layers.

The specific gravity (density) of the respective core layers is an important property, because they affect the Moment of Inertia (MOI) of the ball. In one preferred embodiment, the inner core layer has a relatively low specific gravity ("$SG_{inner}$"). For example, the inner core layer may have a specific gravity within a range having a lower limit of about 0.20 or 0.34 or 0.28 or 0.30 or 0.34 or 0.35 or 0.40 or 0.42 or 0.44 or 0.50 or 0.53 or 0.57 or 0.60 or 0.62 or 0.65 or 0.70 or 0.75 or 0.77 or 0.80 g/cc and an upper limit of about 0.82 or 0.85 or 0.88 or 0.90 or 0.95 or 1.00 or 1.10 or 1.15 or 1.18 or 1.25 g/cc. In a particularly preferred version, the inner core has a specific gravity of about 0.50 g/cc. Also, as discussed below, the specific gravity of the inner core may vary at different particular points of the inner core structure. That is, there may be a specific gravity gradient in the inner core. For example, in one preferred version, the geometric center of the inner core has a density in the range of about 0.25 to about 0.75 g/cc; while the outer skin of the inner core has a density in the range of about 0.75 to about 1.35 g/cc. By the term, "specific gravity of the inner core layer"

("$SG_{inner}$"), it is generally meant the specific gravity of the outer core layer as measured at any point in the outer core layer.

Meanwhile, the outer core layer preferably has a relatively high specific gravity ($SG_{outer}$). Thus, the specific gravity of the inner core layer ($SG_{inner}$) is preferably less than the specific gravity of the outer core layer ($SG_{outer}$). By the term, "specific gravity of the outer core layer" ("$SG_{outer}$"), it is generally meant the specific gravity of the outer core layer as measured at any point in the outer core layer. The specific gravity values at different particular points in the outer core layer may vary. That is, there may be specific gravity gradients in the outer core layer similar to the gradients found in the inner core. For example, the outer core layer may have a specific gravity within a range having a lower limit of about 0.60 or 0.64 or 0.66 or 0.70 or 0.72 or 0.75 or 0.78 or 0.80 or 0.82 or 0.85 or 0.88 or 0.90 g/cc and an upper limit of about or 0.95 or 1.00 or 1.05 or 1.10 or 1.14 or 1.20 or 1.25 or 1.30 or 1.36 or 1.40 or 1.42 or 1.48 or 1.50 or 1.60 or 1.66 or 1.70 1.75 or 2.00 g/cc. In a particularly preferred version, the inner core has a specific gravity of about 1.05 g/cc.

In general, the specific gravities of the respective pieces of an object affect the Moment of Inertia (MOI) of the object. The Moment of Inertia of a ball (or other object) about a given axis generally refers to how difficult it is to change the ball's angular motion about that axis. If the ball's mass is concentrated towards the center, less force is required to change its rotational rate, and the ball has a relatively low Moment of Inertia. In such balls, the center piece (that is, the inner core) has a higher specific gravity than the outer piece (that is, the outer core layer). In such balls, most of the mass is located close to the ball's axis of rotation and less force is needed to generate spin. Thus, the ball has a generally high spin rate as the ball leaves the club's face after making impact. Because of the high spin rate, amateur golfers may have a difficult time controlling the ball and hitting it in a relatively straight line. Such high-spin balls tend to have a side-spin so that when a golfer hook or slices the ball, it may drift off-course and land in a neighboring fairway.

Conversely, if the ball's mass is concentrated towards the outer surface, more force is required to change its rotational rate, and the ball has a relatively high Moment of Inertia. In such balls, the center piece (that is, the inner core) has a lower specific gravity than the outer piece (that is, the outer core layer). That is, in such balls, most of the mass is located away from the ball's axis of rotation and more force is needed to generate spin. Thus, the ball has a generally low spin rate as the ball leaves the club's face after making impact. Because of the low spin rate, amateur golfers may have an easier time controlling the ball and hitting it in a relatively straight line. The ball tends to travel a greater distance which is particularly important for driver shots off the tee.

As described in Sullivan, U.S. Pat. No. 6,494,795 and Ladd et al., U.S. Pat. No. 7,651,415, the formula for the Moment of Inertia for a sphere through any diameter is given in the CRC Standard Mathematical Tables, 24th Edition, 1976 at 20 (hereinafter CRC reference). In the present invention, the finished golf balls preferably have a Moment of Inertia in the range of about 55.0 g./cm$^2$ to about 95.0 g./cm$^2$, preferably about 62.0 g./cm$^2$ to about 92.0 g./cm$^2$ Samples of finished golf balls having such Moment of Inertia values are provided in the Examples below.

The term, "specific gravity" as used herein, has its ordinary and customary meaning, that is, the ratio of the density of a substance to the density of water at 4° C., and the density of water at this temperature is 1 g/cm$^3$.

The golf balls of this invention preferably have a high Moment of Inertia and are relatively low spin and long distance. The ball tends to travel a long distance and has less side-spin when a club face makes impact with the ball. The above-described core construction (wherein the inner core is made of a foamed composition and the surrounding outer core is preferably made of a thermoset rubber composition and the specific gravity of the outer core is greater than the specific gravity of the inner core [$SG_{outer\ core}>SG_{center}$]) contributes to a ball having relatively low spin and long distance properties. Moreover, as discussed further below, the specific gravity of the inner cover is preferably greater than the specific gravity of the outer core ($SG_{inner\ cover}>SG_{outer\ core}$). Thus, most of the ball's mass is located away from the ball's center (axis of rotation) and this helps produce even lower spin rate and longer distance properties. The foam cores and resulting balls also have relatively high resiliency so the ball will reach a relatively high velocity when struck by a golf club and travel a long distance.

In particular, the inner foam cores of this invention preferably have a Coefficient of Restitution (COR) of about 0.300 or greater; more preferably about 0.400 or greater, and even more preferably about 0.450 or greater. The resulting balls containing the dual-layered core constructions of this invention and cover of at least one layer preferably have a COR of about 0.700 or greater, more preferably about 0.730 or greater; and even more preferably about 0.750 to 0.810 or greater.

The USGA has established a maximum weight of 45.93 g (1.62 ounces) for golf balls. For play outside of USGA rules, the golf balls can be heavier. In one preferred embodiment, the weight of the multi-layered core is in the range of about 28 to about 42 grams. Also, golf balls made in accordance with this invention can be of any size, although the USGA requires that golf balls used in competition have a diameter of at least 1.68 inches. For play outside of United States Golf Association (USGA) rules, the golf balls can be of a smaller size. Normally, golf balls are manufactured in accordance with USGA requirements and have a diameter in the range of about 1.68 to about 1.80 inches. As discussed further below, the golf ball contains a multi-layered cover and also may contain intermediate (casing) layers, so the thickness levels of these layers also must be considered. Thus, in general, the dual-layer core structure normally has an overall diameter within a range having a lower limit of about 1.00 or 1.20 or 1.30 or 1.40 inches and an upper limit of about 1.58 or 1.60 or 1.62 or 1.66 inches, and more preferably in the range of about 1.3 to 1.65 inches. In one embodiment, the diameter of the core sub-assembly is in the range of about 1.45 to about 1.62 inches. In turn, the casing layers (optional) and cover layers provide a ball having a diameter of at least 1.68 inches to meet USGA regulations.

Hardness of Core Layers.

The hardness of the core sub-assembly (inner core and outer core layer) also is an important property. In general, cores with relatively high hardness values have higher compression and tend to have good durability and resiliency. However, some high compression balls are stiff and this may have a detrimental effect on shot control and placement. Thus, the optimum balance of hardness in the core sub-assembly needs to be attained.

In one preferred golf ball, the inner core (center) has a "positive" hardness gradient (that is, the outer surface of the inner core is harder than its geometric center); and the outer core layer has a "positive" hardness gradient (that is, the outer surface of the outer core layer is harder than the inner surface of the outer core layer.) In such cases where both the inner core and outer core layer each has a "positive" hardness gradient, the outer surface hardness of the outer core layer is preferably greater than the hardness of the geometric center of the inner core. In one preferred version, the positive hardness gradient of the inner core is in the range of about 2 to about 40 Shore C units and even more preferably about 10 to about 25 Shore C units; while the positive hardness gradient of the outer core is in the range of about 2 to about 20 Shore C and even more preferably about 3 to about 10 Shore C.

In an alternative version, the inner core may have a positive hardness gradient; and the outer core layer may have a "zero" hardness gradient (that is, the hardness values of the outer surface of the outer core layer and the inner surface of the outer core layer are substantially the same) or a "negative" hardness gradient (that is, the outer surface of the outer core layer is softer than the inner surface of the outer core layer.) For example, in one version, the inner core has a positive hardness gradient; and the outer core layer has a negative hardness gradient in the range of about 2 to about 25 Shore C. In a second alternative version, the inner core may have a zero or negative hardness gradient; and the outer core layer may have a positive hardness gradient. Still yet, in another embodiment, both the inner core and outer core layers have zero or negative hardness gradients.

In general, hardness gradients are further described in Bulpett et al., U.S. Pat. Nos. 7,537,529 and 7,410,429, the disclosures of which are hereby incorporated by reference. Methods for measuring the hardness of the inner core and outer core layers along with other layers in the golf ball and determining the hardness gradients of the various layers are described in further detail below. The core layers have positive, negative, or zero hardness gradients defined by hardness measurements made at the outer surface of the inner core (or outer surface of the outer core layer) and radially inward towards the center of the inner core (or inner surface of the outer core layer). These measurements are made typically at 2-mm increments as described in the test methods below. In general, the hardness gradient is determined by subtracting the hardness value at the innermost portion of the component being measured (for example, the center of the inner core or inner surface of the outer core layer) from the hardness value at the outer surface of the component being measured (for example, the outer surface of the inner core or outer surface of the outer core layer).

Positive Hardness Gradient.

For example, if the hardness value of the outer surface of the inner core is greater than the hardness value of the inner core's geometric center (that is, the inner core has a surface harder than its geometric center), the hardness gradient will be deemed "positive" (a larger number minus a smaller number equals a positive number.) For example, if the outer surface of the inner core has a hardness of 67 Shore C and the geometric center of the inner core has a hardness of 60 Shore C, then the inner core has a positive hardness gradient of 7. Likewise, if the outer surface of the outer core layer has a greater hardness value than the inner surface of the outer core layer, the given outer core layer will be considered to have a positive hardness gradient.

Negative Hardness Gradient.

On the other hand, if the hardness value of the outer surface of the inner core is less than the hardness value of the inner core's geometric center (that is, the inner core has a surface softer than its geometric center), the hardness gradient will be deemed "negative." For example, if the outer surface of the inner core has a hardness of 68 Shore C and the geometric center of the inner core has a hardness of 70 Shore C, then the inner core has a negative hardness gradient of 2. Likewise, if the outer surface of the outer core layer has a lesser hardness value than the inner surface of the outer core layer, the given outer core layer will be considered to have a negative hardness gradient.

Zero Hardness Gradient.

In another example, if the hardness value of the outer surface of the inner core is substantially the same as the hardness value of the inner core's geometric center (that is, the surface of the inner core has about the same hardness as the geometric center), the hardness gradient will be deemed "zero." For example, if the outer surface of the inner core and the geometric center of the inner core each has a hardness of 65 Shore C, then the inner core has a zero hardness gradient. Likewise, if the outer surface of the outer core layer has a hardness value approximately the same as the inner surface of the outer core layer, the outer core layer will be considered to have a zero hardness gradient.

More particularly, the term, "positive hardness gradient" as used herein means a hardness gradient of positive 3 Shore C or greater, preferably 7 Shore C or greater, more preferably 10 Shore C, and even more preferably 20 Shore C or greater. The term, "zero hardness gradient" as used herein means a hardness gradient of less than 3 Shore C, preferably less than 1 Shore C and may have a value of zero or negative 1 to negative 10 Shore C. The term, "negative hardness gradient" as used herein means a hardness value of less than zero, for example, negative 3, negative 5, negative 7, negative 10, negative 15, or negative 20 or negative 25. The terms, "zero hardness gradient" and "negative hardness gradient" may be used herein interchangeably to refer to hardness gradients of negative 1 to negative 10.

The inner core preferably has a geometric center hardness ($H_{inner\ core\ center}$) of about 5 Shore D or greater. For example, the ($H_{inner\ core\ center}$) may be in the range of about 5 to about 88 Shore D and more particularly within a range having a lower limit of about 5 or 10 or 18 or 20 or 26 or 30 or 34 or 36 or 38 or 42 or 48 or 50 or 52 Shore D and an upper limit of about 54 or 56 or 58 or 60 or 62 or 64 or 68 or 70 or 74 or 76 or 80 or 82 or 84 or 88 Shore D. In another example, the center hardness of the inner core ($H_{inner\ core\ center}$), as measured in Shore C units, is preferably about 10 Shore C or greater; for example, the $H_{inner\ core\ center}$ may have a lower limit of about 10 or 14 or 16 or 20 or 23 or 24 or 28 or 31 or 34 or 37 or 40 or 44 Shore C and an upper limit of about 46 or 48 or 50 or 51 or 53 or 55 or 58 or 61 or 62 or 65 or 68 or 71 or 74 or 76 or 78 or 79 or 80 or 84 or 90 Shore C. Concerning the outer surface hardness of the inner core ($H_{inner\ core\ surface}$), this hardness is preferably about 12 Shore D or greater; for example, the $H_{inner\ core\ surface}$ may fall within a range having a lower limit of about 12 or 15 or 18 or 20 or 22 or 26 or 30 or 34 or 36 or 38 or 42 or 48 or 50 or 52 Shore D and an upper limit of about 54 or 56 or 58 or 60 or 62 or 70 or 72 or 75 or 78 or 80 or 82 or 84 or 86 or 90 Shore D. In one version, the outer surface hardness of the inner core ($H_{inner\ core\ surface}$), as measured in Shore C units, has a lower limit of about 13 or 15 or 18 or 20 or 22 or 24 or 27 or 28 or 30 or 32 or 34 or 38 or 44 or 47 or 48 Shore C and an upper limit of about 50 or 54 or 56 or 61 or 65 or 66 or 68 or 70 or 73 or 76 or 78 or 80 or 84 or 86 or 88 or 90 or 92 Shore C. In another version, the geometric center hardness ($H_{inner\ core\ center}$) is in the range of about 10 Shore C to about 50 Shore C; and the outer surface hardness of the inner core ($H_{inner\ core\ surface}$) is in the range of about 5 Shore C to about 50 Shore C.

On the other hand, the outer core layer preferably has an outer surface hardness ($H_{outer\ surface\ of\ OC}$) of about 40 Shore D or greater, and more preferably within a range having a lower limit of about 40 or 42 or 44 or 46 or 48 or 50 or 52 and an upper limit of about 54 or 56 or 58 or 60 or 62 or 64 or 70 or 74 or 78 or 80 or 82 or 85 or 87 or 88 or 90 Shore D. The outer surface hardness of the outer core layer ($H_{outer\ surface\ of\ OC}$), as measured in Shore C units, preferably has a lower limit of about 40 or 42 or 45 or 48 or 50 or 54 or 58 or 60 or 63 or 65 or 67 or 720 or 72 or 73 or 76 Shore C, and an upper limit of about 78 or 80 or 84 or 87 or 88 or 89 or 90 or 92 or 95 Shore C. And, the inner surface of the outer core layer ($H_{inner\ surface\ of\ OC}$) or midpoint hardness of the outer core layer ($H_{midpoint\ of\ OC}$), preferably has a hardness of about 40 Shore D or greater, and more preferably within a range having a lower limit of about 40 or 42 or 44 or 46 or 48 or 50 or 52 and an upper limit of about 54 or 56 or 58 or 60 or 62 or 64 or 70 or 74 or 78 or 80 or 82 or 85 or 87 or 88 or 90 Shore D. The inner surface hardness ($H_{inner\ surface\ of\ OC}$) or midpoint hardness ($H_{midpoint\ of\ OC}$) of the outer core layer, as measured in Shore C units, preferably has a lower limit of about 40 or 42 or 44 or 45 or 47 or 50 or 52 or 54 or 55 or 58 or 60 or 63 or 65 or 67 or 70 or 73 or 75 Shore C, and an upper limit of about 78 or 80 or 85 or 88 or 89 or 90 or 92 or 95 Shore C.

In one embodiment, the outer surface hardness of the outer core layer ($H_{outer\ surface\ of\ OC}$), is less than the outer surface hardness ($H_{inner\ core\ surface}$) or midpoint hardness ($H_{midpoint\ of\ OC}$), of the inner core by at least 3 Shore C units and more preferably by at least 5 Shore C.

In a second embodiment, the outer surface hardness of the outer core layer ($H_{outer\ surface\ of\ OC}$), is greater than the outer surface hardness ($H_{inner\ core\ surface}$) or midpoint hardness ($H_{midpoint\ of\ OC}$), of the inner core by at least 3 Shore C units and more preferably by at least 5 Shore C.

As discussed above, the inner core is preferably formed from a foamed thermoplastic or thermoset composition and more preferably foamed polyurethanes. And, the outer core layer is formed preferably from a non-foamed thermoset composition such as polybutadiene rubber.

The core structure also has a hardness gradient across the entire core assembly. In one embodiment, the ($H_{inner\ core\ center}$) is in the range of about 10 to about 60 Shore C, preferably about 13 to about 55 Shore C and more preferably about 15 to about 50 Shore C; and the ($H_{outer\ surface\ of\ OC}$) is in the range of about 65 to about 96 Shore C, preferably about 68 to about 94 Shore C and more preferably about 75 to about 92 Shore C, to provide a positive hardness gradient across the core assembly.

In another embodiment, the $H_{inner\ core\ center}$ is in the range of about 20 to about 70 Shore A and the $H_{outer\ surface\ of\ OC}$ is in the range of about 25 to about 58 Shore D to provide a positive hardness gradient across the core assembly. The gradient will vary based on several factors including, but not limited to, the dimensions of the inner core and outer core layers.

The inner core preferably has a diameter in the range of about 0.100 to about 1.100 inches. For example, the inner core may have a diameter within a range of about 0.100 to about 0.500 inches. In another example, the inner core may have a diameter within a range of about 0.300 to about 0.800 inches. More particularly, the inner core may have a diameter size with a lower limit of about 0.10 or 0.12 or 0.15 or 0.25 or 0.30 or 0.35 or 0.45 or 0.55 inches and an upper limit of about 0.60 or 0.65 or 0.70 or 0.80 or 0.90 or 1.00 or 1.10 inches. As far as the outer core layer is concerned, it preferably has a thickness in the range of about 0.100 to about 0.750 inches. For example, the lower limit of thickness may be about 0.050 or 0.100 or 0.150 or 0.200 or 0.250 or 0.300 or 0.340 or 0.400 and the upper limit may be about 0.500 or 0.550 or 0.600 or 0.650 or 0.700 or 0.750 inches.

Dual-layered core structures containing layers with various thickness and volume levels may be made in accordance with this invention. For example, in one version, the total diameter of the core structure is 0.20 inches and the total volume of the core structure is 0.23 cc. More particularly, in this example, the diameter of the inner core is 0.10 inches and the volume of the inner core is 0.10 cc; while the thickness of the outer core is 0.100 inches and the volume of the outer core is 0.13 cc. In another version, the total core diameter is about 1.55 inches and the total core volume is 31.96 cc. In this version, the outer core layer has a thickness of 0.400 inches and volume of 28.34 cc. Meanwhile, the inner core has a diameter of 0.75 inches and volume of 3.62 cm. In one embodiment, the volume of the outer core layer is greater than the volume of the inner core. In another embodiment, the volume of the outer core layer and inner core are equivalent. In still another embodiment, the volume of the outer core layer is less than the volume of the inner core. Other examples of core structures containing layers of varying thicknesses and volumes are described below in Table A.

TABLE A

Sample Core Dimensions

| Example | Total Core Diameter | Total Core Volume | Thermoset Outer Core Thickness | Outer Core Volume | Foamed Inner Core Diameter | Volume of Inner Core |
|---|---|---|---|---|---|---|
| A-C | 0.30" | 0.23 cc | 0.100" | 0.13 cc | 0.10" | 0.10 cc |
| B-C | 1.60" | 33.15 cc | 0.750" | 33.05 cc | 0.10" | 0.10 cc |
| C-C | 1.55" | 31.96 cc | 0.225" | 11.42 cc | 1.10" | 11.42 cc |
| D-C | 1.55" | 31.96 cc | 0.400" | 28.34 cc | 0.75" | 3.62 cc |
| E-C | 1.55" | 31.96 cc | 0.525" | 28.34 cc | 0.50" | 3.62 cc |

Cover Structure

The golf ball sub-assemblies of this invention may be enclosed with one or more cover layers. The golf ball sub-assembly may comprise the multi-layered core structure as discussed above. In other versions, the golf ball sub-assembly includes the core structure and one or more casing (mantle) layers disposed about the core. In one particularly preferred version, the golf ball includes a multi-layered cover comprising inner and outer cover layers.

In one preferred embodiment, a thermoplastic ionomer composition is used to form the inner cover. Such thermoplastic ionomers may be the same material used to form the outer core layer as described above. Preferred ionomers are salts of O/X- and O/X/Y-type acid copolymers, wherein O is an α-olefin, X is a $C_3$-$C_8$ α,β-ethylenically unsaturated carboxylic acid, and Y is a softening monomer. O is preferably selected from ethylene and propylene. X is preferably selected from methacrylic acid, acrylic acid, ethacrylic acid, crotonic acid, and itaconic acid. Methacrylic acid and acrylic acid are particularly preferred. Y is preferably selected from (meth)acrylate and alkyl (meth)acrylates wherein the alkyl groups have from 1 to 8 carbon atoms, including, but not limited to, n-butyl (meth)acrylate, isobutyl (meth)acrylate, methyl (meth)acrylate, and ethyl (meth)acrylate. These O/X- and O/X/Y-type acid copolymers, along with E/X and E/X/Y-type acid copolymers are described in detail above.

The inner cover layer is preferably formed from a composition comprising an ionomer or a blend of two or more ionomers that helps impart hardness to the ball. In a particular embodiment, the inner cover layer is formed from a composition comprising a high acid ionomer. A particularly suitable high acid ionomer is Surlyn 8150® (DuPont). Surlyn 8150® is a copolymer of ethylene and methacrylic acid, having an acid content of 19 wt %, which is 45% neutralized with sodium. In another particular embodiment, the inner cover layer is formed from a composition comprising a high acid ionomer and a maleic anhydride-grafted non-ionomeric polymer. A particularly suitable maleic anhydride-grafted polymer is Fusabond 525D® (DuPont). Fusabond 525D® is a maleic anhydride-grafted, metallocene-catalyzed ethylene-butene copolymer having about 0.9 wt % maleic anhydride grafted onto the copolymer. A particularly preferred blend of high acid ionomer and maleic anhydride-grafted polymer is an 84 wt %/16 wt % blend of Surlyn 8150® and Fusabond 525D®. Blends of high acid ionomers with maleic anhydride-grafted polymers are further disclosed, for example, in U.S. Pat. Nos. 6,992,135 and 6,677,401, the entire disclosures of which are hereby incorporated herein by reference.

The inner cover layer also may be formed from a composition comprising a 50/45/5 blend of Surlyn® 8940/Surlyn® 9650/Nucrel® 960, and, in a particularly preferred embodiment, the composition has a material hardness of from 80 to 85 Shore C. In yet another version, the inner cover layer is formed from a composition comprising a 50/25/25 blend of Surlyn® 8940/Surlyn® 9650/Surlyn® 9910, preferably having a material hardness of about 90 Shore C. The inner cover layer also may be formed from a composition comprising a 50/50 blend of Surlyn® 8940/Surlyn® 9650, preferably having a material hardness of about 86 Shore C. A composition comprising a 50/50 blend of Surlyn® 8940 and Surlyn® 7940 also may be used. Surlyn® 8940 is an E/MAA copolymer in which the MAA acid groups have been partially neutralized with sodium ions. Surlyn® 9650 and Surlyn® 9910 are two different grades of E/MAA copolymer in which the MAA acid groups have been partially neutralized with zinc ions. Nucrel® 960 is an E/MAA copolymer resin nominally made with 15 wt % methacrylic acid.

As noted above, the specific gravity (density) of the inner cover layer is an important property, because it affects the Moment of Inertia (MOI) of the ball. The composition used to form the inner cover layer of this invention is formulated to have relatively high specific gravity levels. The specific gravity of the inner cover is preferably greater than the specific gravity of the outer core ($SG_{inner\ cover} > SG_{outer\ core}$). And, the specific gravity of the outer core is preferably greater than the specific gravity of the inner core ($SG_{outer\ core} > SG_{center}$) as discussed above. The inner cover layer has a relatively high specific gravity and this means more of the ball's overall mass is located away from the ball's axis of rotation. Thus, the ball has a relatively high Moment of Inertia and tends to have a lower spin rate and longer flight distance properties. In one preferred embodiment, the $SG_{inner\ cover}$ is at least about 105%, preferably at least about 120% greater, than the $SG_{outer\ core}$. For example, in one version, the $SG_{inner\ cover}$ is about 1.45 g/cc. and the $SG_{outer\ core}$ is about 1.05 g/cc. Meanwhile, in one preferred embodiment, the $SG_{outer\ core}$ is at least about 125%, preferably at least about 160% greater than the $SG_{center}$. For example, in one version, the $SG_{outer\ core}$ is about 1.05 g/cc and the $SG_{center}$ is about 0.5 g/cc.

By the term, "specific gravity of the inner cover layer" ("$SG_{inner\ cover}$"), it is generally meant the specific gravity of the inner cover layer as measured at any point of the inner cover layer. For example, the inner cover layer may have a specific gravity within a range having a lower limit of about 1.00 or 1.10 or 1.25 or 1.30 or 1.36 or 1.40 or 1.42 or 1.45 or 1.48 or 1.50 or 1.60 or 1.66 or 1.75 or 2.00 g/cc and an upper limit of about 2.50 or 2.60 or 2.80 or 2.90 or 3.00 or 3.10 or 3.25 or 3.50 or 3.60 or 3.80 or 4.00, 4.25 or 4.75 or 5.00 or 5.10 g/cc.

The composition used to make the inner cover may include fillers to adjust the specific gravity of the composition as needed. These specific-gravity adjusting fillers include high-density and low-density fillers. Suitable fillers include, for example, metal (or metal alloy) powder, metal oxide, metal stearates, particulates, carbonaceous materials, and the like, and blends thereof. Examples of useful metal (or metal alloy) powders include, but are not limited to, bismuth powder, boron powder, brass powder, bronze powder, cobalt powder, copper powder, Inconel™ metal powder, iron metal powder, molybdenum powder, nickel powder, stainless steel powder, titanium metal powder, zirconium oxide powder, aluminum flakes, tungsten metal powder, beryllium metal powder, zinc metal powder, or tin metal powder. Examples of metal oxides include, but are not limited to, zinc oxide, iron oxide, aluminum oxide, titanium dioxide, magnesium oxide, zirconium oxide, and tungsten trioxide. Examples of particulate carbonaceous materials include, but are not limited to, graphite and carbon black. Examples of other useful fillers include but are not limited to graphite fibers, precipitated hydrated silica, clay, talc, glass fibers, aramid fibers, mica, calcium metasilicate, barium sulfate, zinc sulfide, silicates, diatomaceous earth, calcium carbonate, magnesium carbonate, rubber regrind, manganese powder, and magnesium powder, cotton flock, natural bitumen, cellulose flock, and leather fiber. Micro balloon fillers such as glass and ceramic fillers also can be used.

Concerning the outer cover layer, which is disposed about the inner cover, a wide variety of materials may be used to form this layer, including, for example, non-foamed thermoset or thermoplastic compositions. More particularly, polyurethanes; polyureas; copolymers, blends and hybrids of polyurethane and polyurea; olefin-based copolymer ionomer resins (for example, Surlyn® ionomer resins and DuPont HPF® 1000 and HPF® 2000, commercially available from DuPont; Iotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; acid copolymers, for example, poly(meth)

acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, commercially available from Arkema Inc; cross-linked trans-polyisoprene and blends thereof; polyester-based thermoplastic elastomers, such as Hytrel®, commercially available from DuPont or RiteFlex®, commercially available from Ticona Engineering Polymers; polyurethane-based thermoplastic elastomers, such as Elastollan®, commercially available from BASF; synthetic or natural vulcanized rubber; and combinations thereof. Castable polyurethanes, polyureas, and hybrids of polyurethanes-polyureas are particularly desirable because these materials can be used to make a golf ball having high resiliency and a soft feel. By the term, "hybrids of polyurethane and polyurea," it is meant to include copolymers and blends thereof.

Polyurethanes, polyureas, and blends, copolymers, and hybrids of polyurethane/polyurea are also particularly suitable for forming cover layers. When used as cover layer materials, polyurethanes and polyureas can be thermoset or thermoplastic. Thermoset materials can be formed into golf ball layers by conventional casting or reaction injection molding techniques. Thermoplastic materials can be formed into golf ball layers by conventional compression or injection molding techniques.

The compositions used to make the inner and outer cover layers may contain a wide variety of fillers and additives to impart specific properties to the ball. For example, relatively heavy-weight and light-weight fillers may be added to adjust the specific gravity of the inner and outer cover layers as discussed above. Other additives include, but are not limited to, optical brighteners, coloring agents, fluorescent agents, whitening agents, UV absorbers, light stabilizers, surfactants, processing aids, antioxidants, stabilizers, softening agents, fragrance components, plasticizers, impact modifiers, titanium dioxide, clay, mica, talc, glass flakes, milled glass, and mixtures thereof.

The inner cover layer preferably has a material hardness within a range having a lower limit of 70 or 72 or 75 or 80 or 82 Shore C and an upper limit of 85 or 86 or 88 or 90 or 92 Shore C. The thickness of the inner cover layer is preferably within a range having a lower limit of 0.010 or 0.015 or 0.020 or 0.030 inches and an upper limit of 0.035 or 0.045 or 0.080 or 0.120 inches. The outer cover layer preferably has a material hardness of 85 Shore C or less. The thickness of the outer cover layer is preferably within a range having a lower limit of 0.010 or 0.015 or 0.025 inches and an upper limit of 0.035 or 0.040 or 0.055 or 0.080 inches. Methods for measuring hardness of the layers in the golf ball are described in further detail below. In one embodiment, the inner cover layer has an outer surface hardness ($H_{outer\ surface\ of\ IC}$) within a range having a lower limit of about 45 or 47 or 50 or 52 or 54 or 58 or 60 or 62 or 65 Shore C and an upper limit of about 68 or 70 or 72 or 75 or 78 or 80 or 81 or 85 or 86 or 90 or 92 or 94 or 98 Shore C. Measuring according to a Shore D scale, in one embodiment, the inner cover layer has a ($H_{outer\ surface\ of\ IC}$) within a range having a lower limit of about 40 or 44 or 48 or 51 or 52 or 56 or 58 Shore D and an upper limit of about 60 or 64 or 68 or 70 or 74 or 75 or 78 or 80 or 84 or 86 Shore D. Meanwhile, in one embodiment, the outer cover layer may have a surface hardness within a range having a lower limit of about 20 or 26 or 30 or 34 or 38 or 42 or 44 or 48 or 50 or 52 or 56 Shore D and an upper limit of about 60 or 64 or 66 or 67 or 70 or 72 or 75 or 78 or 80 or 84 Shore D. In one embodiment, the surface hardness of the outer core layer is greater than the center hardness of the inner core and surface hardness of the inner cover layer. In an alternative embodiment, the surface hardness of the outer core layer is less than the center hardness of the inner core and surface hardness of the inner cover layer.

The core structure and inner cover also has a hardness gradient across the core/inner cover assembly. As discussed above, in one embodiment, the ($H_{inner\ core\ center}$) is in the range of about 10 to about 60 Shore C, preferably about 13 to about 55 Shore C and more preferably about 15 to about 50 Shore C; and the ($H_{outer\ surface\ of\ OC}$) is in the range of about 65 to about 96 Shore C, preferably about 68 to about 94 Shore C and more preferably about 75 to about 92 Shore C. Thus, a positive hardness gradient is provided across the core sub-assembly.

Meanwhile, in one such embodiment, the hardness of the outer surface of the inner cover ($H_{outer\ surface\ of\ IC}$) is in the range of about 60 to about 98 Shore C, preferably about 64 to about 94 Shore C and more preferably about 72 to about 88 Shore C. Thus, a positive hardness gradient is provided across the core/inner cover assembly. The gradient across the core/inner cover assembly will vary based on several factors including, but not limited to, the dimensions of the inner core, outer core, and inner cover.

Figure 4:
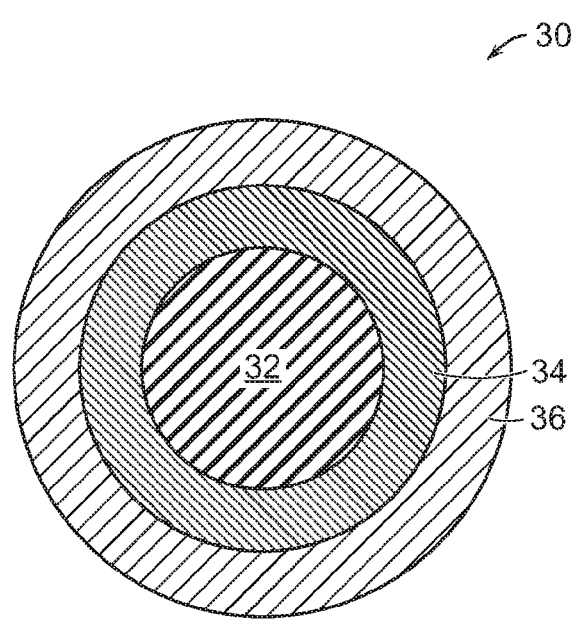
FIG. 4 is a cross-sectional view of a dual-layered core/inner cover layer golf ball sub-assembly made in accordance with the present invention.

In FIG. 4, one version of a core/inner cover sub-assembly (30) for a golf ball is shown. The dual-layered core has a center (32) and outer core layer (34) surrounded by an inner cover (36). The geometric center of the inner core (where the $H_{inner\ core\ center}$ is measured); midpoint of the outer core layer (where the $H_{midpoint\ of\ OC}$ is measured); and hardness of the outer surface of the inner cover (where the $H_{outer\ surface\ of\ IC}$ is measured) are shown in FIG. 4.

Preferably, the inner cover is formed from a thermoplastic ionomeric material as discussed above, the outer cover layer is formed from a polyurethane material, and the outer cover layer has a hardness that is less than that of the inner cover layer. Preferably, the inner cover has a hardness of greater than about 60 Shore D and the outer cover layer has a hardness of less than about 60 Shore D. In an alternative embodiment, the inner cover layer is comprised of a partially or fully neutralized ionomer, a thermoplastic polyester elastomer such as Hytrel™ commercially available form DuPont, a thermoplastic polyether block amide, such as Pebax™ commercially available from Arkema, Inc., or a thermoplastic or thermosetting polyurethane or polyurea, and the outer cover layer is comprised of an ionomeric material. In this alternative embodiment, the inner cover layer has a hardness of less than about 60 Shore D and the outer cover layer has a hardness of greater than about 55 Shore D and the inner cover layer hardness is less than the outer cover layer hardness.

In yet another embodiment, a multi-layered cover comprising inner and outer cover layers is formed, where the inner cover layer has a thickness of about 0.01 inches to about 0.06 inches, more preferably about 0.015 inches to about 0.040 inches, and most preferably about 0.02 inches to about 0.035 inches. In this version, the inner cover layer is formed from a partially- or fully-neutralized ionomer having a Shore D hardness of greater than about 55, more preferably greater than about 60, and most preferably greater than about 65. The outer cover layer, in this embodiment, preferably has a thickness of about 0.015 inches to about 0.055 inches, more preferably about 0.02 inches to about 0.04 inches, and most preferably about 0.025 inches to about 0.035 inches, with a hardness of about 80 Shore D or less, more preferably 70 or less, and most preferably about 60 or less. The inner cover layer is harder than the outer cover layer in this version. A preferred outer cover layer is a castable or reaction injection molded polyurethane, polyurea or copolymer, blend, or hybrid thereof having a Shore D hardness of about 40 to about 50. In another multi-layer cover, dual-core embodiment, the outer cover and inner cover layer materials and thickness are the same but, the hardness range is reversed, that is, the outer cover layer is harder than the inner cover layer. For this harder outer cover/softer inner cover embodiment, the ionomer resins described above would preferably be used as outer cover material.

Manufacturing of Golf Balls

As described above, the inner core preferably is formed by a casting method. The outer core layer, which surrounds the inner core, is formed by molding compositions over the inner core. Compression or injection molding techniques may be used to form the other layers of the core sub-assembly. Then, the casing and/or cover layers are applied over the core sub-assembly. Prior to this step, the core structure may be surface-treated to increase the adhesion between its outer surface and the next layer that will be applied over the core. Such surface-treatment may include mechanically or chemically-abrading the outer surface of the core. For example, the core may be subjected to corona-discharge, plasma-treatment, silane-dipping, or other treatment methods known to those in the art.

The cover layers are formed over the core or ball sub-assembly (the core structure and any casing layers disposed about the core) using a suitable technique such as, for example, compression-molding, flip-molding, injection-molding, retractable pin injection-molding, reaction injection-molding (RIM), liquid injection-molding, casting, spraying, powder-coating, vacuum-forming, flow-coating, dipping, spin-coating, and the like. Preferably, each cover layer is separately formed over the ball subassembly. For example, an ethylene acid copolymer ionomer composition used to form the inner cover, as described above, may be injection-molded to produce half-shells. Alternatively, the ionomer composition may be placed into a compression mold and molded under sufficient pressure, temperature, and time to produce the hemispherical shells. The smooth-surfaced hemispherical shells are then placed around the core sub-assembly in a compression mold. Under sufficient heating and pressure, the shells fuse together to form an inner cover layer that surrounds the sub-assembly. In another method, the ionomer composition is injection-molded directly onto the core sub-assembly using retractable pin injection molding. An outer cover layer comprising a polyurethane or polyurea composition over the ball sub-assembly may be formed by using a mold-casting process.

In one such casting process. a polyurethane prepolymer and curing agent are mixed in a motorized mixer inside of a mixing head by metering amounts of the curative and prepolymer through the feed lines. A mold having upper and lower hemispherical-shaped mold cavities and with interior dimple patterns is used. (72a) and (74a). Each mold cavity has an arcuate inner surface defining an inverted dimple pattern. The upper and lower mold cavities can be preheated and filled with the reactive polyurethane and curing agent mixture. After the reactive mixture has resided in the lower mold cavities for a sufficient time period, typically about 40 to about 100 seconds, the golf ball core/inner cover assembly can be lowered at a controlled speed into the reacting mixture. Ball cups can hold the assemblies by applying reduced pressure (or partial vacuum). After sufficient gelling (typically about 4 to about 12 seconds), the vacuum can be removed and the assembly can be released. Then, the upper half-molds can be mated with the lower half-molds. An exothermic reaction occurs when the polyurethane prepolymer and curing agent are mixed and this continues until the material solidifies around the subassembly. The molded balls can then be cooled in the mold and removed when the molded cover layer is hard enough to be handled without deforming. This molding technique is described in the patent literature including Hebert et al., U.S. Pat. No. 6,132,324, Wu, U.S. Pat. No. 5,334,673, and Brown et al., U.S. Pat. No. 5,006,297, the disclosures of which are hereby incorporated by reference.

As discussed above, the lower and upper mold cavities have interior dimple cavity details. When the mold cavities are mated together, they define an interior spherical cavity that forms the cover for the ball. The cover material encapsulates the inner ball subassembly to form a unitary, one-piece cover structure. Furthermore, the cover material conforms to the interior geometry of the mold cavities to form a dimple pattern on the surface of the ball. The mold cavities may have any suitable dimple arrangement such as, for example, icosahedral, octahedral, cube-octahedral, dipyramid, and the like. In addition, the dimples may be circular, oval, triangular, square, pentagonal, hexagonal, heptagonal, octagonal, and the like.

After the golf balls have been removed from the mold, they may be subjected to finishing steps such as flash-trimming, surface-treatment, marking, coating, and the like using techniques known in the art. For example, in traditional white-colored golf balls, the white-pigmented cover may be surface-treated using a suitable method such as, for example, corona, plasma, or ultraviolet (UV) light-treatment. Then, indicia such as trademarks, symbols, logos, letters, and the like may be printed on the ball's cover using pad-printing, ink-jet printing, dye-sublimation, or other suitable printing methods. Clear surface coatings (for example, primer and top-coats), which may contain a fluorescent whitening agent, are applied to the cover. The resulting golf ball has a glossy and durable surface finish.

Figure 5:
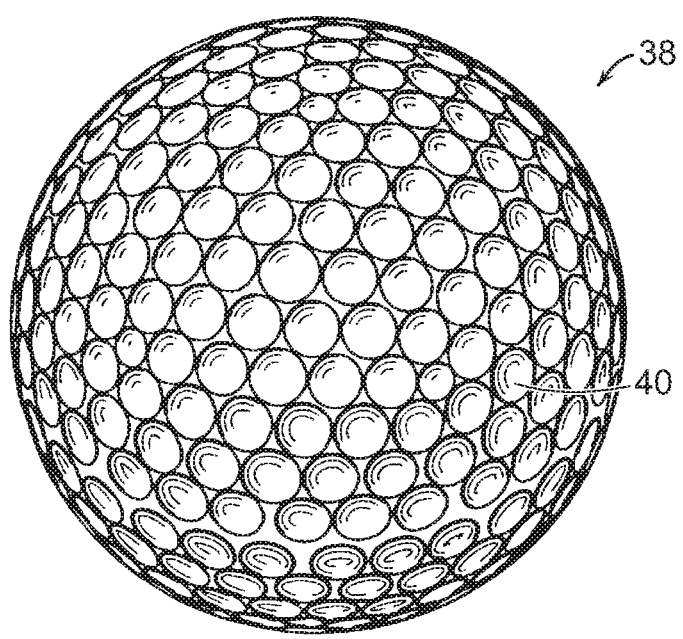
FIG. 5 is a perspective view of a finished golf ball having a dimpled cover made in accordance with the present invention.

In another finishing process, the golf balls are painted with one or more paint coatings. For example, white primer paint may be applied first to the surface of the ball and then a white top-coat of paint may be applied over the primer. Of course, the golf ball may be painted with other colors, for example, red, blue, orange, and yellow. As noted above, markings such as trademarks and logos may be applied to the painted cover of the golf ball. Finally, a clear surface coating may be applied to the cover to provide a shiny appearance and protect any logos and other markings printed on the ball. In FIG. 5, a finished golf (38) having a dimpled outer cover made in accordance with the present invention is shown. As discussed above, various patterns and geometric shapes of the dimples (40) can be used to modify the aerodynamic properties of the golf ball.

Different ball constructions can be made using the core and cover constructions of this invention as shown in FIGS. 1-5. Such golf ball constructions include, for example, five-piece, and six-piece constructions. It should be understood that the golf ball components and golf balls shown in FIGS. 1-5 are for illustrative purposes only, and they are not meant to be restrictive. Other golf ball constructions can be made in accordance with this invention.

Test Methods

Hardness.

The center hardness of a core is obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to ensure that the golf ball or golf ball sub-assembly is centered under the durometer indenter before a surface hardness reading is obtained. A calibrated, digital durometer, capable of reading to 0.1 hardness units is used for the hardness measurements. The digital durometer must be attached to, and its foot made parallel to, the base of an automatic stand. The weight on the durometer and attack rate conforms to ASTM D-2240.

In certain embodiments, a point or plurality of points measured along the "positive" or "negative" gradients may be above or below a line fit through the gradient and its outermost and innermost hardness values. In an alternative preferred embodiment, the hardest point along a particular steep "positive" or "negative" gradient may be higher than the value at the innermost portion of the inner core (the geometric center) or outer core layer (the inner surface)—as long as the outermost point (i.e., the outer surface of the inner core) is greater than (for "positive") or lower than (for "negative") the innermost point (i.e., the geometric center of the inner core or the inner surface of the outer core layer), such that the "positive" and "negative" gradients remain intact.

As discussed above, the direction of the hardness gradient of a golf ball layer is defined by the difference in hardness measurements taken at the outer and inner surfaces of a particular layer. The center hardness of an inner core and hardness of the outer surface of an inner core in a single-core ball or outer core layer are readily determined according to the test procedures provided above. The outer surface of the inner core layer (or other optional intermediate core layers) in a dual-core ball are also readily determined according to the procedures given herein for measuring the outer surface hardness of a golf ball layer, if the measurement is made prior to surrounding the layer with an additional core layer. Once an additional core layer surrounds a layer of interest, the hardness of the inner and outer surfaces of any inner or intermediate layers can be difficult to determine. Therefore, for purposes of the present invention, when the hardness of the inner or outer surface of a core layer is needed after the inner layer has been surrounded with another core layer, the test procedure described above for measuring a point located 1 mm from an interface is used. Likewise, the midpoint of a core layer is taken at a point equidistant from the inner surface and outer surface of the layer to be measured, most typically an outer core layer. Once again, once one or more core layers surround a layer of interest, the exact midpoint may be difficult to determine, therefore, for the purposes of the present invention, the measurement of "midpoint" hardness of a layer is taken within plus or minus 1 mm of the measured midpoint of the layer.

Also, it should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other. Shore hardness (for example, Shore A, Shore C or Shore D hardness) was measured according to the test method ASTM D-2240.

Compression.

As disclosed in Jeff Dalton's Compression by Any Other Name, Science and Golf IV, Proceedings of the World Scientific Congress of Golf (Eric Thain ed., Routledge, 2002) ("J. Dalton"), several different methods can be used to measure compression, including Atti compression, Riehle compression, load/deflection measurements at a variety of fixed loads and offsets, and effective modulus. For purposes of the present invention, compression refers to Soft Center Deflection Index ("SCDI"). The SCDI is a program change for the Dynamic Compression Machine ("DCM") that allows determination of the pounds required to deflect a core 10% of its diameter. The DCM is an apparatus that applies a load to a core or ball and measures the number of inches the core or ball is deflected at measured loads. A crude load/deflection curve is generated that is fit to the Atti compression scale that results in a number being generated that represents an Atti compression. The DCM does this via a load cell attached to the bottom of a hydraulic cylinder that is triggered pneumatically at a fixed rate (typically about 1.0 ft/s) towards a stationary core. Attached to the cylinder is an LVDT that measures the distance the cylinder travels during the testing timeframe. A software-based logarithmic algorithm ensures that measurements are not taken until at least five successive increases in load are detected during the initial phase of the test. The SCDI is a slight variation of this set up. The hardware is the same, but the software and output has changed. With the SCDI, the interest is in the pounds of force required to deflect a core x amount of inches. That amount of deflection is 10% percent of the core diameter. The DCM is triggered, the cylinder deflects the core by 10% of its diameter, and the DCM reports back the pounds of force required (as measured from the attached load cell) to deflect the core by that amount. The value displayed is a single number in units of pounds.

Drop Rebound.

By "drop rebound," it is meant the number of inches a sphere will rebound when dropped from a height of 72 inches in this case, measuring from the bottom of the sphere. A scale, in inches is mounted directly behind the path of the dropped sphere and the sphere is dropped onto a heavy, hard base such as a slab of marble or granite (typically about 1 ft wide by 1 ft high by 1 ft deep). The test is carried out at about 72-75° F. and about 50% RH Coefficient of Restitution ("COR").

The COR is determined according to a known procedure, wherein a golf ball or golf ball sub-assembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. The COR is then calculated as the ratio of the ball's outgoing transit time period to the ball's incoming transit time period ($COR=V_{out}/V_{in}=T_{in}/T_{out}$).

Density.

The density refers to the weight per unit volume (typically, $g/cm^3$) of the material and can be measured per ASTM D-1622.

EXAMPLES

The present invention is illustrated further by the following Examples, but these Examples should not be construed as limiting the scope of the invention.

In the following Examples, different foam formulations were used to prepare core samples using the above-described molding methods. The different formulations are described in Tables 1-3 below. The concentrations are in parts per hundred (phr), unless otherwise indicated. As used herein, the term "parts per hundred," also known as "phr," is defined as the number of parts by weight of a particular component present in a mixture, relative to 100 parts by weight of the base component. Mathematically, this can be expressed as the weight of an ingredient divided by the total weight of the polymer, multiplied by a factor of 100.

TABLE 1

Spherical Foam Core Samples

| | Example No. | | | | | |
|---|---|---|---|---|---|---|
| | 1 | 2 | 3 | 4 | 5 | 6 |
| 6.5% MDI Prepolymer | 41.00 | 43.72 | 45.01 | 33.58 | 49.48 | 31.83 |
| Mondur MR | | | 7.33 | | | 13.64 |
| Mondur CD | 19.75 | | | | | |
| Mondur ML | | 17.00 | | 13.06 | 8.06 | |
| Poly THF 650 | | | 22.20 | | 13.06 | 29.01 |
| CAPA 3031 | 13.77 | 13.77 | | | 4.00 | |
| CAPA 3091 | | | | 27.86 | | |
| CAPA 4101 | | | | | | |
| CAPA 4801 | | | | | | |
| D.I. Water | 0.50 | 0.50 | 0.45 | 0.50 | 0.45 | 0.50 |
| Niax 1500 | 0.75 | 0.75 | 0.75 | 0.75 | | 0.75 |
| Varox MPBC | | | | | | |
| Irganox 1135 | | | | | | |
| Dabco 33LV | 0.20 | 0.20 | 0.20 | 0.20 | | 0.20 |
| Garamite 1958 | 0.38 | 0.38 | 0.38 | 0.38 | | 0.38 |
| Total Parts | 76.35 | 76.32 | 76.32 | 76.33 | 75.05 | 76.31 |
| Density | 0.54 | 0.70 | 0.60 | 0.53 | 0.60 | |
| Compression | 35 | 106 | −217 | −242 | −217 | |
| COR @125 ft/s | 0.434 | 0.503 | 0.520 | 0.278 | 0.410 | |

6.5% MDI Prepolymer is made from 4,4'-MDI and polytetramethylene glycol ether (PTMEG 2000) (2000 m. w.).
Mondur™ MR—polymeric MDI, available from Bayer.
Mondur™ CD—modified 4,4'-MDI, available from Bayer.
Mondur™ ML—isomer mixture of 2,4 and 4,4'-MDI, available from Bayer.
Poly THF™ 650-650 molecular weight polyetratmethylene ether glycol (PTMEG), available from BASF.
CAPA™ 3031—low molecular weight trifunctional polycaprolactone polyol, available from Perstorp.

CAPA™ 3091—polyester triol terminated by primary hydroxyl groups, available from Perstorp.
CAPA™ 4101—tetra-functional polyol terminated with primary hydroxyl groups, available from Perstorp.
CAPA™ 4801—tetra-functional polyol terminated with primary hydroxyl groups, available from Perstorp.
Niax™ L-1500—silicone surfactant available from Momentive Specialty Chemicals, Inc.
Vanox™ MBPC—antioxidant, available from R.T. Vanderbuilt.
Irganox™ 1135—antioxidant, available from BASF.
Dabco™ 33LV—tertiary amine catalyst, available from Air Products.
Garamite™ 1958—mixed mineral thixotropes (clay mixture), available from Southern Clay Products.

TABLE 2

Spherical Foam Core Samples

| | Example No. | | | | | |
|---|---|---|---|---|---|---|
| | 7 | 8 | 9 | 10 | 11 | 12 |
| 6.5% MDI Prepolymer | 21.67 | 45.81 | 49.22 | 45.01 | 45.01 | 55.80 |
| Mondur MR | 18.46 | 7.46 | 8.01 | 7.33 | 7.33 | 9.08 |
| Mondur CD | | | | | | |
| Mondur ML | | | | | | |
| Poly THF 650 | 34.33 | 20.57 | 13.00 | 22.20 | 22.20 | |
| CAPA 3031 | | 0.70 | 4.00 | | | 9.66 |
| CAPA 3091 | | | | | | |
| CAPA 4101 | | | | | | |
| CAPA 4801 | | | | | | |
| D.I. Water | 0.53 | 0.45 | 0.45 | 0.45 | 0.45 | 0.45 |
| Niax 1500 | 0.75 | 0.75 | 0.75 | 0.75 | 0.75 | 0.75 |
| Varox MPBC | | | | | 0.38 | |
| Irganox 1135 | | | | | 0.38 | |
| Dabco 33LV | 0.20 | 0.20 | 0.20 | 0.20 | 0.20 | 0.20 |
| Garamite 1958 | 0.38 | 0.38 | 0.38 | 0.38 | 0.38 | 0.38 |
| Total Parts | 76.32 | 76.32 | 76.01 | 76.69 | 76.70 | 76.32 |
| Density | 0.46 | | | | | 0.4 |
| Compression | −245 | | | | | −109 |
| COR @125 ft/s | 0.388 | | | | | 0.515 |

TABLE 3

Spherical Foam Core Samples

| | Example No. | | | | | |
|---|---|---|---|---|---|---|
| | 13 | 14 | 15 | 16 | 17 | 18 |
| 6.5% MDI Prepolymer | 68.81 | 44.28 | 33.10 | 42.39 | 49.48 | 40.75 |
| Mondur MR | | 12.49 | 17.05 | 11.96 | 8.06 | 11.50 |
| Mondur CD | | | | | | |
| Mondur ML | | | | | | |
| Poly THF 650 | | | | | | |
| CAPA 3031 | 5.79 | 5.05 | 2.86 | 2.37 | 2.00 | |
| CAPA 3091 | | | | | | |
| CAPA 4101 | | 12.67 | 21.48 | 17.79 | 15.00 | 22.27 |
| CAPA 4801 | | | | | | |
| D.I. Water | 0.39 | 0.45 | 0.67 | 0.48 | 0.45 | 0.48 |
| Niax 1500 | 0.75 | 0.75 | 0.75 | 0.75 | 0.75 | 0.75 |
| Varox MPBC | | | | | | |
| Irganox 1135 | | | | | | |
| Dabco 33LV | 0.20 | 0.20 | 0.20 | 0.20 | 0.20 | 0.20 |
| Garamite 1958 | 0.38 | 0.38 | 0.38 | 0.38 | 0.38 | 0.38 |
| Total Parts | 76.32 | 76.26 | 76.49 | 76.32 | 76.32 | 76.33 |
| Density | 0.52 | 0.35 | 0.64 | 0.39 | 0.46 | 0.39 |
| Compression | −200 | −144 | 45 | −135 | −165 | −120 |
| COR @125 ft/s | 0.540 | 0.534 | 0.571 | 0.553 | 0.537 | 0.543 |

TABLE 4

Spherical Foam Core Samples

| | Example No. | | | | | |
|---|---|---|---|---|---|---|
| | 19 | 20 | 21 | 22 | 23 | 24 |
| 6.5% MDI Prepolymer | 47.83 | 56.05 | 29.18 | 19.58 | 43.87 | 50.63 |
| Mondur MR | 7.78 | 9.12 | 12.51 | 16.68 | 9.63 | 5.63 |
| Mondur CD | | | | | | |
| Mondur ML | | | | | | |
| Poly THF 650 | | | | | 2.65 | 2.31 |
| CAPA 3031 | | | | | | |
| CAPA 3091 | | | | | | |
| CAPA 4101 | 18.92 | 18.11 | 17.37 | 20.23 | 18.36 | 15.98 |
| CAPA 4801 | | 16.10 | 15.44 | 17.98 | | |

TABLE 4-continued

Spherical Foam Core Samples

| | Example No. | | | | | |
|---|---|---|---|---|---|---|
| | 19 | 20 | 21 | 22 | 23 | 24 |
| D.I. Water | 0.45 | 0.61 | 0.50 | 0.52 | 0.47 | 0.45 |
| Niax 1500 | 0.75 | 0.75 | 0.75 | 0.75 | 0.75 | 0.75 |
| Varox MPBC | | | | | | |
| Irganox 1135 | | | | | | |
| Dabco 33LV | 0.20 | 0.20 | 0.20 | 0.20 | 0.20 | 0.20 |
| Garamite 1958 | 0.38 | 0.38 | 0.38 | 0.38 | 0.38 | 0.38 |
| Total Parts | 76.31 | 101.32 | 76.33 | 76.32 | 76.31 | 76.33 |
| Density | 0.42 | 0.66 | | 0.51 | 0.46 | 0.57 |
| Compression | −165 | −169 | | −100 | −164 | −169 |
| COR @125 ft/s | 0.609 | 0.492 | | 0.425 | 0.578 | 0.566 |

TABLE 5

Spherical Foam Core Samples

| | Example No. | |
|---|---|---|
| | 25 | 26 |
| 6.5% MDI Prepolymer | 37.21 | 43.57 |
| Mondur MR | 13.07 | 9.56 |
| Mondur CD | | |
| Mondur ML | | |
| Poly THF 650 | 3.06 | 5.25 |
| CAPA 3031 | | |
| CAPA 3091 | | |
| CAPA 4101 | 21.18 | 16.15 |
| CAPA 4801 | | |
| D.I. Water | 0.49 | 0.47 |
| Niax 1500 | 0.75 | 0.75 |
| Varox MPBC | | |
| Irganox 1135 | | |
| Dabco 33LV | 0.20 | 0.20 |
| Garamite 1958 | 0.38 | 0.38 |
| Total Parts | 76.34 | 76.33 |
| Density | 0.43 | 0.45 |
| Compression | −137 | −147 |
| COR @125 ft/s | 0.541 | 0.571 |

Different foam formulations were used to prepare foam centers in the following examples. A thermoset rubber formulation was molded about the foam centers to form an outer core layer. The above-described molding methods were used to prepare the samples. The resulting dual-core assemblies (Samples A-C) were tested for compression (DCM), Coefficient of Restitution (COR), and Hardness using the above-described test methods and the results are reported in Table 10 below.

Sample A (Dual Core Having 0.5" Foamed Center)

In Sample A, the following foam formulation (Table 6) was used to prepare an inner core having a diameter of 0.5 inches. The following rubber formulation (Table 7) was molded about the foamed inner core and cured to form an outer-core.

TABLE 6

(Foam Center of Sample A - 36)

| Ingredient | Parts |
|---|---|
| 6.5% MDI Prepolymer | 45.01 |
| Mondur ™ MR | 7.33 |
| Poly THF ™ 650 | 22.20 |
| Deionized Water | 0.45 |
| Niax ™ L-1500 surfactant | 0.75 |
| Dabco ™ 33LV | 0.20 |
| Garamite ™ 1958 | 0.38 |

TABLE 7

(Rubber Outer Core Layer of Sample A)

| Ingredient | Parts |
|---|---|
| *Buna ™ CB23 | 100.0 |
| Zinc Diacrylate (ZDA) | 35.0 |
| **Perkadox BC | 0.5 |
| Zinc Pentachlorothiophenol (ZnPCTP) | 0.7 |
| Zinc Oxide | 5.0 |

*Buna ™ CB23 - polybutadiene rubber, available from Lanxess Corp.
**Perkadox ™ BC, peroxide free-radical initiator, available from Akzo Nobel.

Sample B (Dual Core Having 0.5" Foamed Center—48)

In Sample B, the following foam formulation (Table 8) was used to prepare an inner core having a diameter of 0.5 inches. The same rubber formulation used in Sample A (Table 7) was molded about the foamed inner core and cured to form an outer core layer.

TABLE 8

(Foam Center of Sample B)

| Ingredient | Parts |
|---|---|
| 6.5% MDI Prepolymer | 55.80 |
| Mondur ™ MR | 9.08 |
| CAPA ™ 3031 | 9.66 |
| Deionized Water | 0.45 |
| Niax ™ L-1500 surfactant | 0.75 |
| Dabco ™ 33LV | 0.20 |
| Garamite ™ 1958 | 0.38 |

In Sample C, the following foam formulation (Table 9) was used to prepare an inner core having a diameter of 0.5 inches. The same rubber formulation used in Sample A (Table 7) was molded about the foamed inner core and cured to form an outer core layer.

TABLE 9

(Foam Center of Sample C - 50)

| Ingredient | Parts |
|---|---|
| 6.5% MDI Prepolymer | 44.28 |
| Mondur ™ MR | 12.49 |
| CAPA ™ 3031 | 5.05 |
| CAPA ™ 4101 | 12.67 |
| Deionized Water | 0.45 |
| Niax ™ L-1500 surfactant | 0.75 |
| Dabco ™ 33LV | 0.20 |
| Garamite ™ 1958 | 0.38 |

TABLE 10

Properties of Dual-Core Samples

| Sample | Diameter Size and Density of Foam Center | Compression (DCM) | COR @ 125 ft/sec | Surface Hardness (Shore C) | Center Hardness (Shore C) | Hardness Gradient (Shore C) |
|---|---|---|---|---|---|---|
| A | 0.5 inches and 0.5 g/cc. | 85 | 0.816 | 88.9 | 22.1 | 66.8 |
| B | 0.5 inches and 0.5 g/cc. | 81 | 0.797 | 86.1 | 46.0 | 40.1 |
| C | 0.5 inches and 0.5 g/cc. | 81 | 0.806 | 87.0 | 43.7 | 43.3 |

As shown in Table 10 above, the dual-layered core samples A, B, and C were tested for hardness and the core was found to have a hardness gradient (across the entire core as measured at points in millimeters (mm) from the geometric center to the outer surface of the outer core layer) in the range of about 20 Shore C to about 90 Shore C. In Sample A, the hardness of the foam core measured at the geometric center was about 22 Shore C and the hardness of the core measured at about 20 mm from the geometric center (that is, the surface of the outer core layer) was about 90 Shore C. In Sample B, the hardness gradient from the foam center to the surface of the rubber outer core layer was about 40 Shore C; and in Sample C, the hardness gradient from the foam center to the surface of the rubber outer core layer was about 43 Shore C. The midpoint hardness of the outer core layer ($H_{midpoint\ of\ OC}$) in each of Samples A, B, and C was about 75 Shore C.

In Sample D, the following foam formulation (Table 11) was used to prepare an inner core having a diameter of 0.75 inches. The same rubber formulation used in Sample A (Table 7) was molded about the foamed inner core and cured to form an outer core layer. The above-described molding methods were used to prepare the samples. Different dual-core assemblies having different densities (Samples D1-D5) were prepared and tested for compression (DCM), Coefficient of Restitution (COR), and Hardness using the above-described test methods and the results are reported in Table 12 below.

TABLE 11

(Foam Center of Sample D - 55)

| Ingredient | Parts |
|---|---|
| 6.5% MDI Prepolymer | 47.83 |
| Mondur ™ MR | 7.78 |
| CAPA ™ 4101 | 18.92 |

TABLE 11-continued (Foam Center of Sample D - 55)

| Ingredient | Parts |
|---|---|
| Deionized Water | 0.45 |
| Niax ™ L-1500 surfactant | 0.75 |
| Dabco ™ 33LV | 0.20 |
| Garamite ™ 1958 | 0.38 |

TABLE 12

Properties of Core Samples (D1-D5)

| Sample | Diameter Size of Foamed Center | Density of Foamed Center (g/cm³) | Compression (DCM) | COR @ 125 ft/sec | Surface Hardness (Shore C) | Center Hardness (Shore C) | Hardness Gradient (Shore C) |
|---|---|---|---|---|---|---|---|
| D-1 | 0.75" | 0.40 | 80 | 0.779 | 86.6 | 33.5 | 53.0 |
| D-2 | 0.75" | 0.46 | 78 | 0.775 | 86.4 | 32.1 | 54.3 |
| D-3 | 0.75" | 0.59 | 77 | 0.770 | 86.4 | 34.1 | 52.3 |
| D-4 | 0.75" | 0.75 | 78 | 0.769 | 87.3 | 43.0 | 44.3 |
| D-5 | 0.75" | 0.83 | 75 | 0.766 | 87.4 | 37.4 | 50.0 |

As shown in Table 12 above, the dual-layered core Samples D-1 to D-5 were tested for hardness and the core was found to have a hardness gradient (across the entire core as measured at points in millimeters (mm) from the geometric center to the outer surface of the outer core layer) in the range of about 44 Shore C to about 55 Shore C. For instance, in Sample D-1, the hardness of the core measured at the geometric center was about 34 Shore C and the hardness of the core measured at about 20 mm from the geometric center (that is, the surface of the outer core layer) was about 87 Shore C.

In the following Examples, different foam formulations (Samples E-G) were used to prepare foam centers (Table 13). A rubber formulation (Table 14) was molded about each of the foam centers and cured to form an outer core layer. The resulting dual-core sub-assemblies (foam center/thermoset rubber outer core layer) were encapsulated with an inner cover layer comprising an ethylene acid copolymer ionomer composition (Table 15). The above-described molding methods were used to prepare the samples. Different dual-core/inner-cover assemblies having different foam center diameters (Samples E1, E2, F1, F2, G1, and G2) were prepared and tested for compression (DCM), Coefficient of Restitution (COR), and Hardness using the above-described test methods and the results are reported in Table 16 below.

TABLE 13

(Foam Center of Samples E-G)

| Ingredients | Sample E (51) (Parts) | Sample F (55) (Parts) | Sample G (60) (Parts) |
|---|---|---|---|
| 6.5% MDI Prepolymer | 33.10 | 47.83 | 50.63 |
| Mondur ™ MR | 17.05 | 7.78 | 5.63 |
| Poly THF ™ 650 | | | 2.31 |
| CAPA ™ 3031 | 2.86 | | |
| CAPA ™ 4101 | 21.48 | 18.92 | 15.98 |
| Deionized Water | 0.67 | 0.45 | 0.45 |
| Niax ™ L-1500 surfactant | 0.75 | 0.75 | 0.75 |
| Dabco ™ 33LV | 0.20 | 0.20 | 0.20 |
| Garamite ™ 1958 | 0.38 | 0.38 | 0.38 |

TABLE 14

(Rubber Outer Core Layer of Samples E-G)

| Ingredient | Parts |
|---|---|
| Buna ™ CB23 | 100.0 |
| Zinc Diacrylate (ZDA) | 36.0 |
| Perkadox BC | 0.5 |
| Zinc Pentachlorothiophenol (ZnPCTP) | 0.5 |
| Zinc Oxide | 21.3 |

TABLE 15

(Tungsten-Filled Inner Cover Layer of Samples E-G)

| Ingredient | Concentration |
|---|---|
| Blend of 50% Surlyn ™ 7940 and 50% Surlyn ™ 8940 ethylene acid copolymer ionomer resins. | 72.5 wt. % (98.1 vol. %) |
| Tungsten Filler | 27.5 wt. % (1.9 vol. %) |

TABLE 16

Properties of Dual-Core/Inner Cover Samples (E1-G2)

| Sample | Diameter Size of Foamed Center | Density of Foamed Center (g/cm³) | Compression (DCM) | COR @ 125 ft/sec | Density of Inner Cover (g/cm³) | Outer Surface Hardness of Inner Cover (Shore C) | Center Hardness of Foam Center (Shore C) | Hardness Gradient (Shore C) |
|---|---|---|---|---|---|---|---|---|
| E-1 | 0.50" | 0.50 | 92 | 0.813 | 1.30 | 93.0 | 52.0 | 41.00 |
| E-2 | 0.75" | 0.50 | 97 | 0.781 | 1.45 | 92.2 | 48.0 | 44.20 |
| F-1 | 0.50" | 0.50 | 88 | 0.814 | 1.30 | 91.7 | 29.0 | 62.70 |
| F-2 | 0.75" | 0.50 | 101 | 0.798 | 1.45 | 94.4 | 27.0 | 67.40 |
| G-1 | 0.50" | 0.50 | 87 | 0.816 | 1.30 | 92.4 | 19.0 | 73.40 |
| G-2 | 0.75" | 0.50 | 99 | 0.808 | 1.45 | 92.9 | 18.0 | 74.90 |

As shown in Table 16, the dual-layered core/inner cover assembly Samples E-1 and E-2 were tested for hardness and the assemblies were found to have a hardness gradient (across the entire structure as measured at points in millimeters (mm) from the geometric center to the outer surface of the inner cover layer) of about 41.00 and 44.2 Shore C, respectively. Samples F-1 and F-2 also were tested and the hardness gradients were about 62.70 and 67.40 Shore C, respectively. Finally, Samples G-1 and G-2 were tested, and the hardness gradients were about 73.40 and 74.90 Shore C, respectively.

The hardness properties of Samples E1-G2, as measured per a Shore A scale, are described below in Table 17.

TABLE 17

Shore A Hardness of Dual-Core/Inner Cover Samples E1-G2

| Sample | Diameter Size of Foamed Center | Density of Foamed Center (g/cm³) | Compression (DCM) | COR @ 125 ft/sec | Density of Inner Cover (g/cm³) | Center Hardness of Foam Center (Shore A) |
|---|---|---|---|---|---|---|
| E-1 | 0.50" | 0.50 | 92 | 0.813 | 1.45 | 89 |
| E-2 | 0.75" | 0.50 | 97 | 0.781 | 1.45 | 86 |
| F-1 | 0.50" | 0.50 | 88 | 0.814 | 1.45 | 67 |
| F-2 | 0.75" | 0.50 | 101 | 0.798 | 1.45 | 63 |
| G-1 | 0.50" | 0.50 | 87 | 0.816 | 1.45 | 42 |
| G-2 | 0.75" | 0.50 | 99 | 0.808 | 1.45 | 39 |

In the following Examples, the dual-core (foam center/thermoset rubber outer core layer) inner cover (ethylene acid copolymer ionomer composition) assemblies as described above (Samples E1-G2) were encapsulated with an outer cover. Particularly, a polyurethane composition was cast-molded over the dual-core/inner cover assemblies to form finished balls. These balls are identified as Samples (E1-G2) in below Table 18, and the Moment of Inertia (MOI) for these ball samples is included in the Table.

TABLE 18

MOI of Finished Ball Samples E1-G2

| Sample (Finished Ball) | Diameter Size of Foamed Center | MOI (g/cm²) |
|---|---|---|
| E-1 | 0.50" | 83.84 |
| E-2 | 0.75" | 85.75 |
| F-1 | 0.50" | 85.53 |
| F-2 | 0.75" | 85.51 |
| G-1 | 0.50" | 83.63 |
| G-2 | 0.75" | 86.37 |

It is understood that the golf ball compositions, constructions, and products described and illustrated herein represent only some embodiments of the invention. It is appreciated by those skilled in the art that various changes and additions can be made to compositions, constructions, and products without departing from the spirit and scope of this invention. It is intended that all such embodiments be covered by the appended claims.

We claim:

1. A multi-layered golf ball, comprising:
a core assembly comprising: i) an inner core layer comprising a foamed composition, the inner core layer having a diameter in the range of about 0.100 to about 1.100 inches and a specific gravity ($SG_{inner}$) and a center hardness ($H_{inner\ core\ center}$); and ii) an outer core layer comprising a non-foamed thermoset or thermoplastic composition, the outer core layer being disposed about the Inner core layer and having a thickness in the range of about 0.100 to about 0.750 inches and a specific gravity ($SG_{outer}$) and an outer surface hardness ($H_{outer\ surface\ of\ OC}$); and
a multi-layered cover comprising: i) an inner cover layer comprising a non-foamed thermoplastic ionomer composition having a specific gravity ($SG_{inner\ cover}$), the ionomer composition comprising an O/X-type acid copolymer, wherein O is α-olefin, and X is a $C_3$-$C_8$ α,β-ethylenically unsaturated carboxylic add; and ii) an outer cover layer comprising a non-foamed thermoset or thermoplastic composition, wherein the $SG_{inner\ cover} > SG_{outer\ core} > SG_{center}$ and the $H_{inner\ core\ center}$ is in the range of about 10 to about 60 Shore C and the $H_{outer\ surface\ of\ OC}$ is in the range of about 65 to about 96 Shore C to provide a positive hardness gradient across the core assembly.

2. The golf ball of claim 1, wherein the O of the O/X-type acid copolymer is selected from the group consisting of ethylene and propylene, and X is selected from the group consisting of methacrylic acid, acrylic acid, ethacrylic acid, crotonic acid, maleic acid, fumaric acid, and itaconic acid.

3. The golf ball of claim 2, wherein the O of the O/X-type acid copolymer is ethylene and the X is methacrylic add or acrylic acid.

4. The golf ball of claim 1, wherein the O/X-type acid copolymer contains acid groups and 30 to 70% of the acid groups are neutralized.

5. The golf ball of claim 1, wherein the O/X-type acid copolymer contains acid groups and greater than 70% of the acid groups are neutralized.

6. The golf ball of claim 1, wherein the ionomer composition further comprises fatty acids or salts of fatty acids.

7. The golf ball of claim 1, wherein the ionomer composition comprises a blend of O/X-type acid copolymers, wherein O is α-olefin, and X is a $C_3$-$C_8$ α,β-ethylenically unsaturated carboxylic acid.

8. The golf ball of claim 1, wherein the foamed composition is a foamed polyurethane composition.

9. The golf ball of claim 1, wherein the outer core layer comprises a thermoset rubber selected from the group consisting of polybutadiene, ethylene-propylene rubber, ethylene-propylene-diene rubber, polyisoprene, styrene-butadiene rubber, polyalkenamers, butyl rubber, halobutyl rubber, polystyrene elastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and mixtures thereof.

10. The golf ball of claim 1, wherein the outer core layer comprises a thermoplastic polymer selected from the group consisting of partially-neutralized ionomers; highly-neutralized ionomers; polyesters; polyamides; polyamide-ethers, polyamide-esters; polyurethanes, polyureas; fluoropolymers; polystyrenes; polypropylenes; polyethylenes; polyvinyl chlorides; polyvinyl acetates; polycarbonates; polyvinyl alcohols; polyester-ethers; polyethers; polyimides, polyetherketones, polyamideimides; and mixtures thereof.

* * * * *